United States Patent [19]

Anderson

[11] Patent Number: 5,355,148
[45] Date of Patent: Oct. 11, 1994

[54] FINGERPOINT MOUSE

[75] Inventor: William J. Anderson, Anaheim, Calif.

[73] Assignee: AST Research, Inc., Irvine, Calif.

[21] Appl. No.: 4,459

[22] Filed: Jan. 14, 1993

[51] Int. Cl.$^5$ ............................................. G09G 3/02
[52] U.S. Cl. ..................................... 345/166; 341/31; 345/163
[58] Field of Search .......................... 340/710; 341/31; 250/229; 200/6 A; 345/163, 166, 158

[56] References Cited

U.S. PATENT DOCUMENTS

| | | |
|---|---|---|
| 4,550,316 | 10/1985 | Whetstone et al. ............... 345/163 |
| 4,680,577 | 7/1987 | Straayer et al. . |
| 4,736,191 | 4/1988 | Matzke et al. . |
| 4,739,128 | 4/1988 | Grisham . |
| 4,812,833 | 3/1989 | Shimauchi ............................ 341/31 |
| 4,853,630 | 8/1989 | Houston . |
| 4,879,556 | 11/1989 | Duimel . |
| 4,992,631 | 2/1991 | Gee ..................................... 200/6 A |
| 5,065,146 | 11/1991 | Garrett ................................. 341/31 |
| 5,119,078 | 6/1992 | Grant . |

FOREIGN PATENT DOCUMENTS 1245782 11/1988 Canada .

OTHER PUBLICATIONS

Cross R.G. "Keyboard Overlay", IBM Technical Disclosure Bulletin, vol. 15 No. 1, Jun. 1972.
Howard, Bill, "Field Mice: Different, Yes. Better, Maybe" PC Magazine, vol. 10, No. 17, pp. 111–112, 123–126, 133 (Oct. 15, 1991).
"Hot PC Products", Electronic Design, vol. 38, No. 11, p. 22 (Jun. 14, 1990).
Reinhardt, Andrew, "Touch–and–Feel Interfaces", BYTE, pp. 223–226 (Feb. 1991).
Dell System 325NC User's Guide, pp. 2–16, 3–1 through 3–4, 3–15, Dell Computer Corporation (Jan. 1992).
"Windows on the Road", Howard Eglowstein, BYTE, vol. 17, No. 3, pp. 208–213, 216, 218, 220 (Mar. 1992).

Primary Examiner—Alvin E. Oberley
Assistant Examiner—Vivian Chang
Attorney, Agent, or Firm—Knobbe, Martens, Olson & Bear

[57] ABSTRACT

A fingerpoint mouse includes an elastic finger pad having a recess formed therein. The recess is configured to receive a finger such as a user's index finger. A photodiode attaches to the underside of the recess and photovoltaic sensing cells form an array opposite the photodiode beneath the recess. The user applies pressure to the fingerpad and thereby causes the diode to point in a direction opposite the direction of the applied pressure. The diode transmits light which impinges on one or more of the photo-voltaic sensing cells. The photo-voltaic cells generate voltage signals indicative of the direction of the pressure applied by the user on the fingerpad. The voltage signals produced by the photo-voltaic cells are decoded and converted to conventional mouse data. The mouse data is used to position a cursor on a graphics screen so that the user controls the movement of the cursor by applying pressure on the fingerpad in the direction of the desired cursor motion.

16 Claims, 15 Drawing Sheets

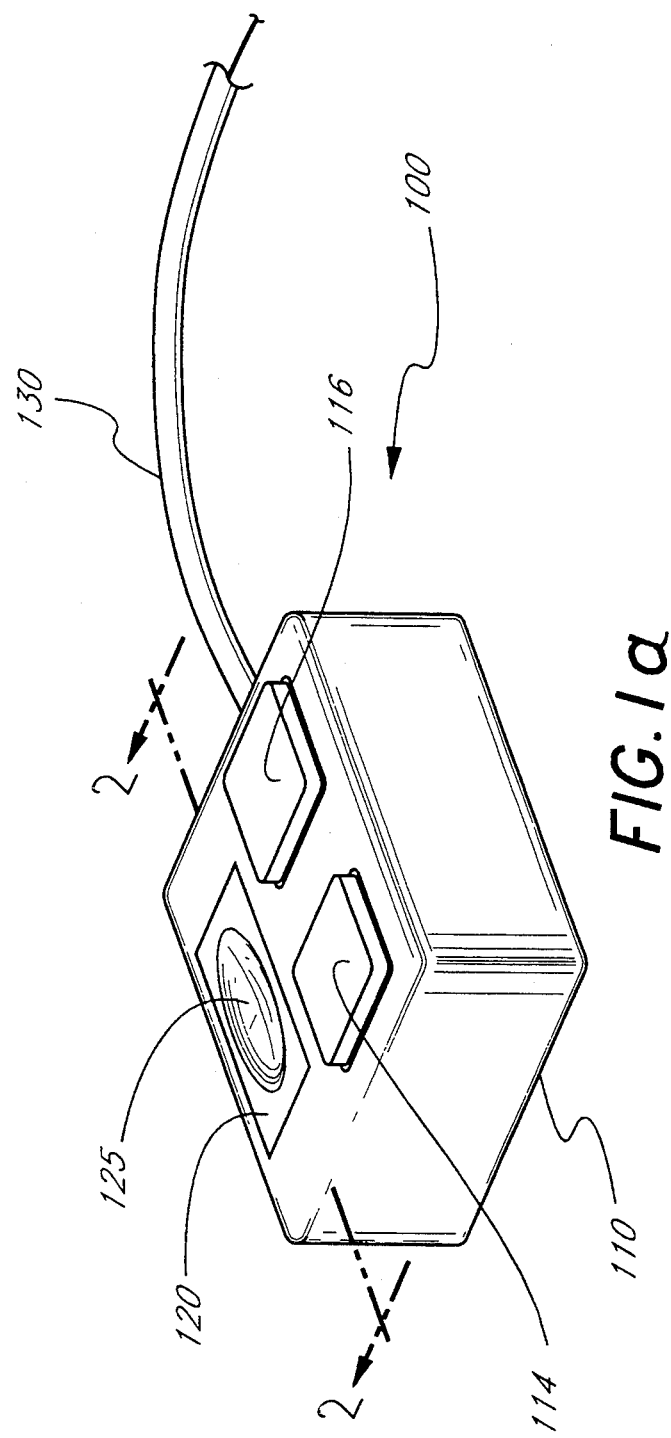

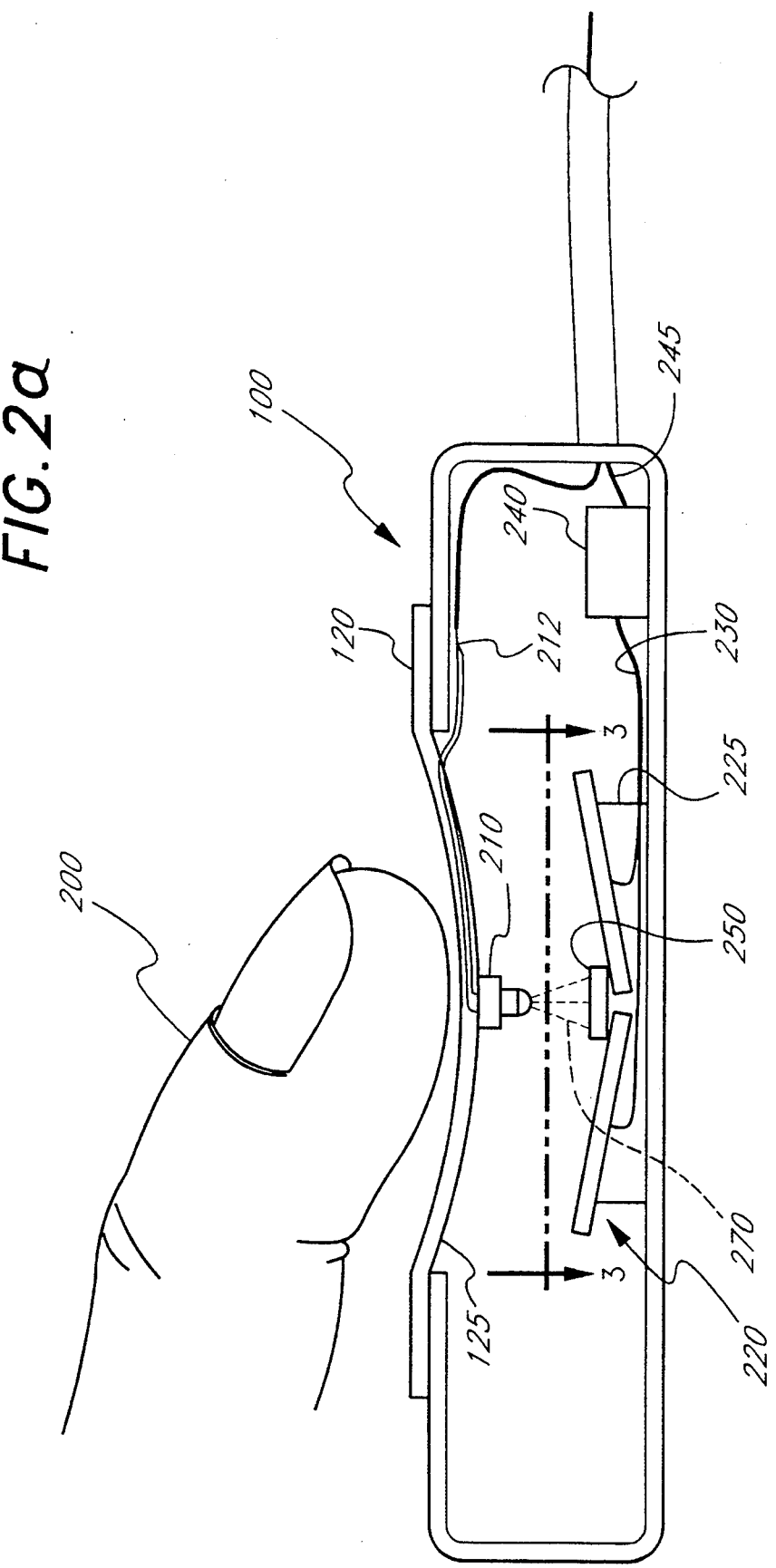

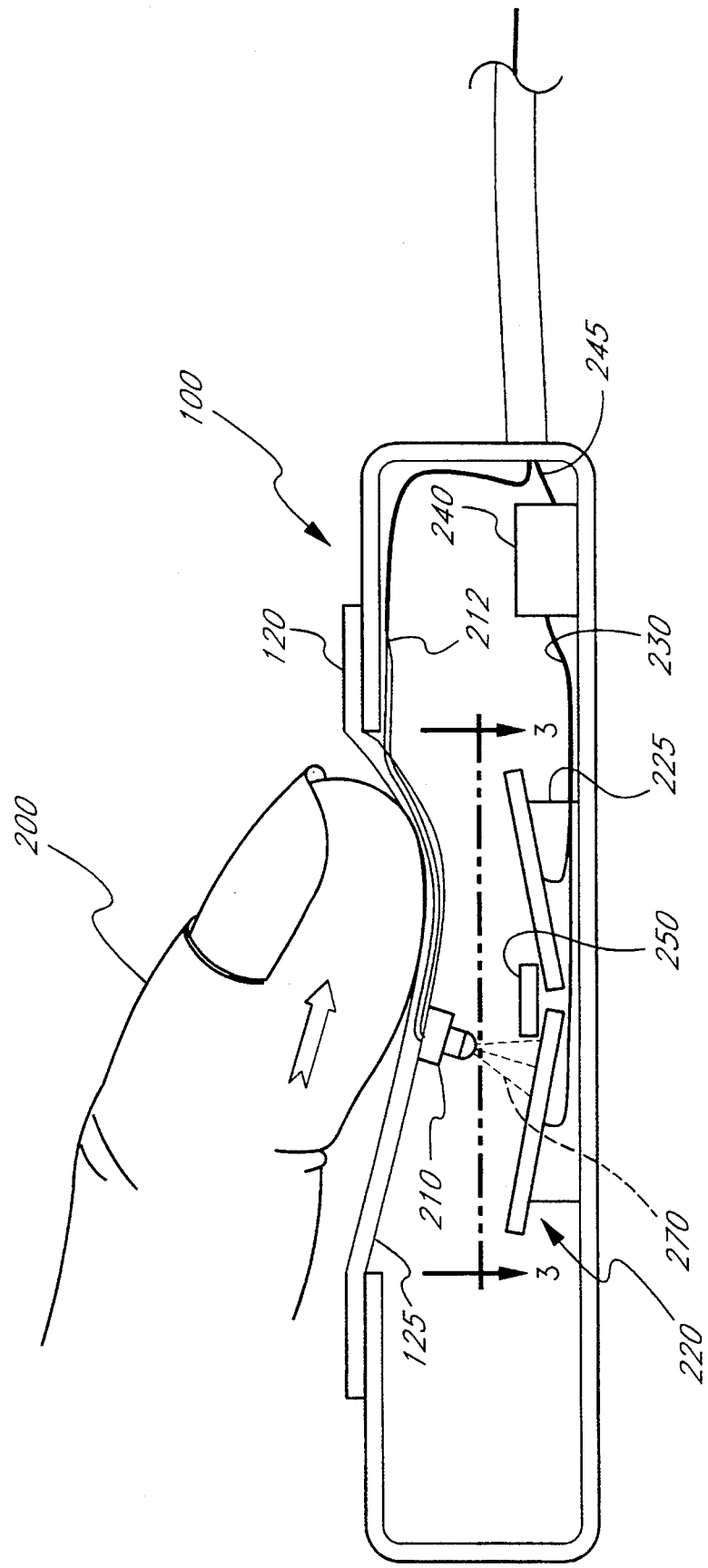

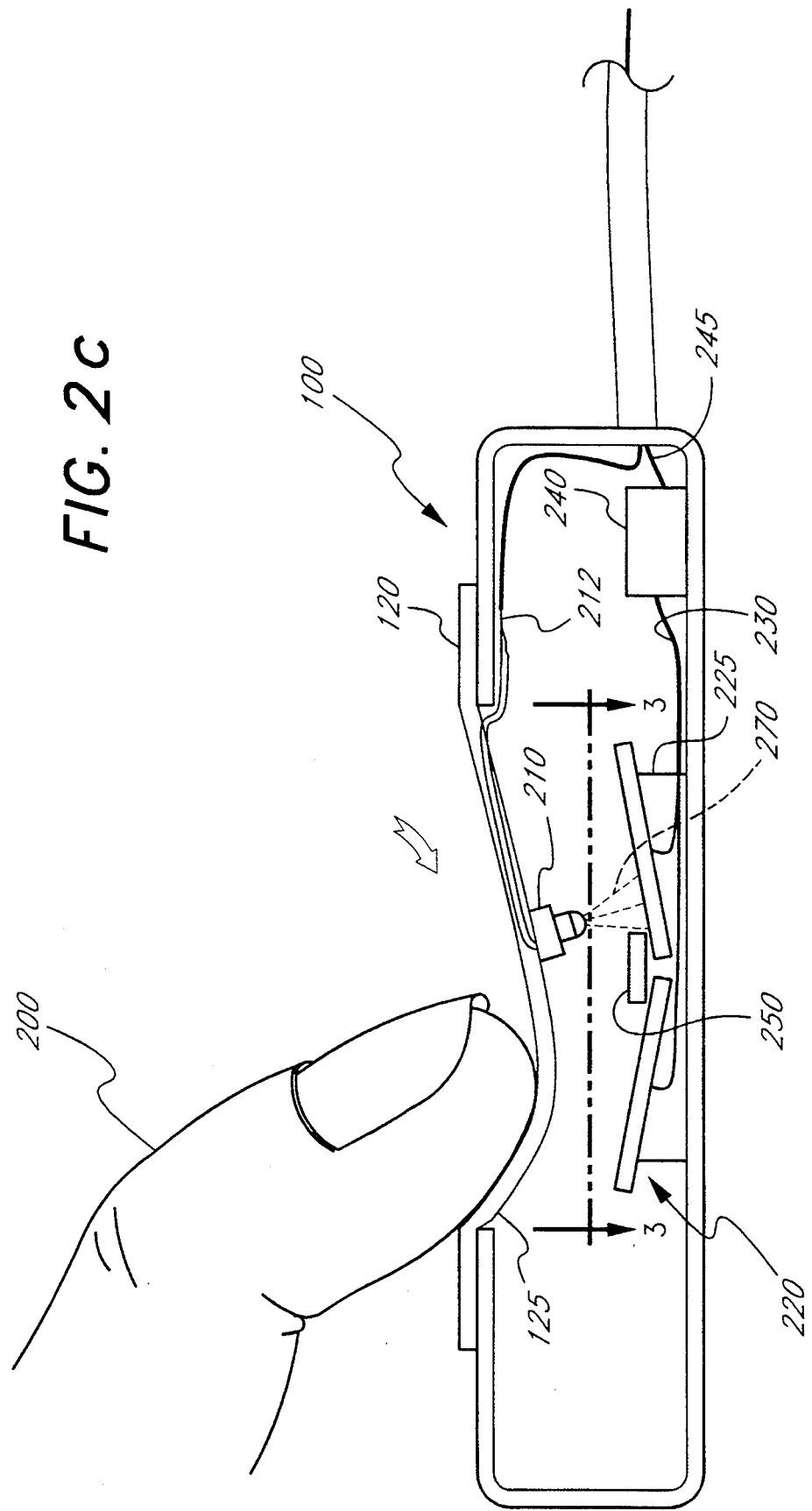

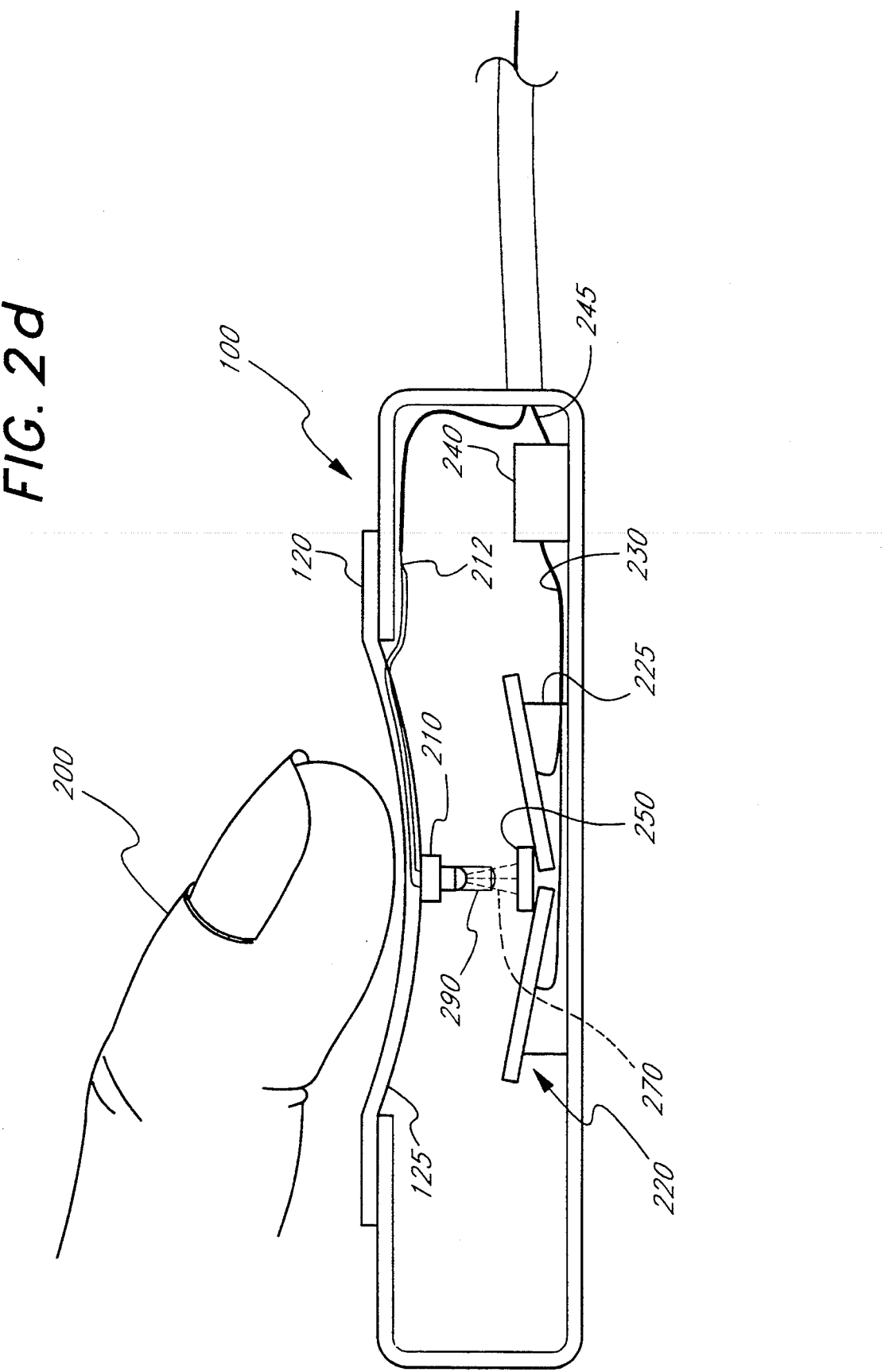

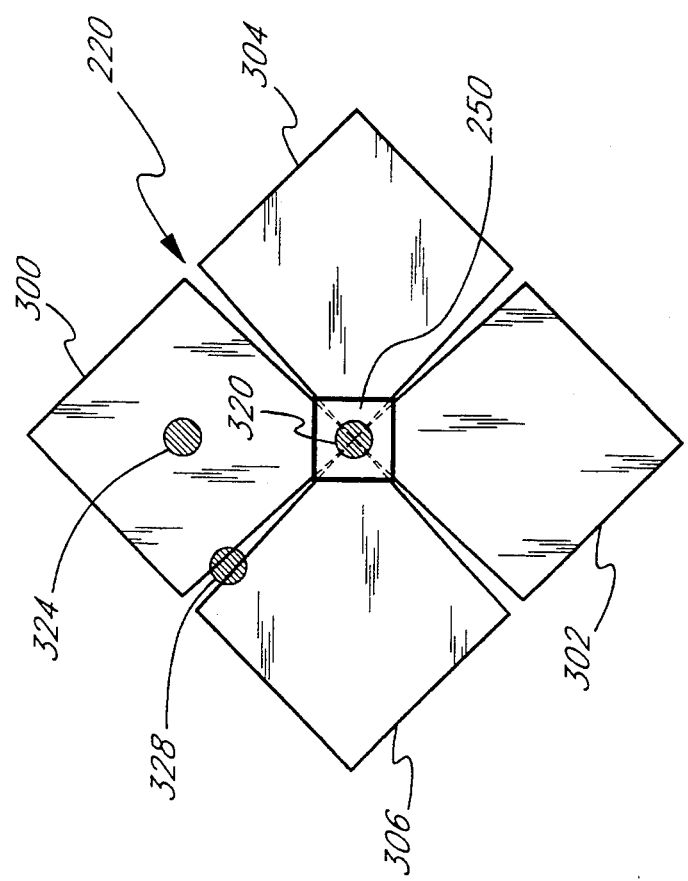

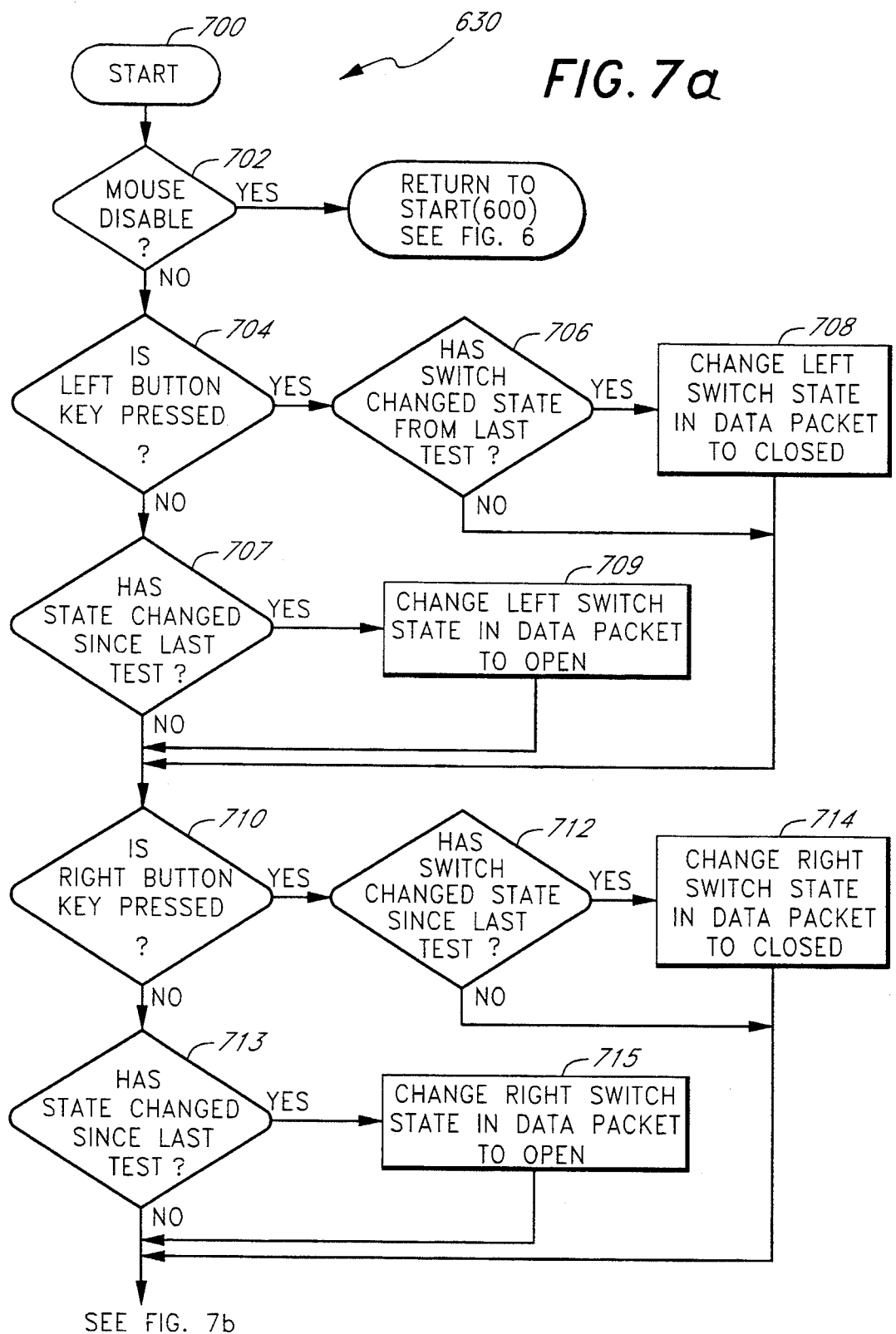

FINGERPOINT MOUSE

BACKGROUND OF THE INVENTION

1. Field of the invention

The present invention generally relates to personal computers, and more particularly to a pointing device system used in conjunction with portable, laptop or notebook computers.

2. Description of Related Art

Pointing devices are commonly used in conjunction with a computer in order to control the movement of a cursor on a graphics screen. Conventional devices employed for this function are arrow keys on a computer keyboard and computer "mice." Arrow keys typically comprise four adjacent bipolar keys, which move the cursor up, down, left, or right upon depression of a respective key. Such keys are commonly used for editing simple textual applications. However, because the keys must be used sequentially and limit the cursor to orthogonal directions of displacement, arrow keys are impractical to use in many more sophisticated graphical applications.

Computer mice employ mechanical, optical, or other means to control the displacement of a cursor on a graphics screen. The mouse is moved over a flat surface in proportion to the desired motion of the cursor on the graphics screen. While providing the computer user with considerable flexibility over the motion of the cursor on the graphics screen, a computer mouse typically requires an auxiliary flat surface proximate to the computer keyboard.

With the introduction of small laptop and notebook computers, flexible built-in pointing devices became necessary. Somewhat smaller, more efficient, and more ergonomic devices have been developed that combine the cursor control flexibility of a mouse with the integral keyboard mounting of arrow keys. A variety of these state-of-the-art devices are described in the February 1991 issue of *BYTE* magazine in an article entitled "Touch-and-Feel Interfaces: Built-In Pointing Devices Replace Mice in Notebooks and Laptops." The devices discussed in this article include trackballs, touchpads, touchscreens, isopoints, and home row keys.

A trackball comprises an upwardly-facing sphere mounted in a specially-designed base that allows the sphere to be freely rotated in any desired direction at any desired velocity. The cursor on the graphics screen is displaced in proportion to the speed and direction at which the sphere is rotated. While trackballs are compact, they require considerable finger movement to produce large cursor displacements at low velocities. In addition, because it is difficult for a system operator to successively rotate the sphere in a constant direction, linearly displacing the cursor on the graphics screen can prove troublesome. Finally, trackballs are not suited for operation in dirty environments because any foreign material deposited on the surface of the sphere can quickly contaminate the internal workings of the unit and thereby impede its operation.

A touchpad comprises an auxiliary rectangular pad whose surface is mapped to correspond to the graphics screen. By touching a location on the touchpad, the computer user directs the computer to move the cursor to the corresponding location on the graphics screen. In addition, because the typical touchpad is considerably smaller than the graphics screen, accurate positioning of the cursor on the graphics screen can prove troublesome. Finally, touchpads only provide control over the cursor's absolute position and do not permit the computer user to direct the cursor's speed or path as it moves from its original to its final position.

A touchscreen is similar to a touchpad except that the system operator interfaces directly with the graphics display by touching the graphics display at a desired location. Similarly, touchscreens only provide control over the cursor's absolute position and do not permit the computer user to direct the cursor's speed or path as it moves from its original to its final position.

An isopoint comprises a cylindrical bar that both slides along and revolves about its central axis. The isopoint is typically located on the upwardly-facing surface of the keyboard proximate to the space bar. The computer user slides or revolves the isopoint to generate horizontal or vertical displacement of the cursor on the graphics screen, respectively. As with trackballs, isopoints require considerable finger movement to produce large cursor displacements at low velocities. In addition, a computer user must simultaneously revolve and slide the cylindrical bar to achieve a diagonal displacement of the cursor on the graphics screen, an unnatural and cumbersome operation. Finally, isopoints are not suited for operation in dirty environments because any foreign material deposited on the surface of the cylindrical bar can quickly contaminate the internal workings of the unit and thereby impede its operation.

A home row key comprises a joystick-like mechanism incorporated into a standard keyboard key. Under normal operation, the key simply functions as a bipolar switch to input a particular character. When used in conjunction with another key (such as the CTRL or ALT key), however, the home row key functions as a joystick to displace the cursor on the graphics screen. The displacement of the cursor is governed by the direction in which the key is moved relative to its neutral position and the duration for which the key is held in the non-neutral position. The home row key includes a force sensing mechanism which senses the force and the direction of the applied force. The cursor, in turn, proportionally responds to a force applied.

The home row key has a number of ergonomic disadvantages. Significantly, the home row key necessarily requires the computer user to simultaneously operate two separate keys, an awkward operation. If the user does not correctly enter the key combination, the user will input alphanumeric characters rather than control the cursor. The user must then delete the characters and then retry the key combination to control the cursor. In addition, because the cursor moves as a function of duration rather than displacement, the computer user cannot quickly move the cursor from one side of the graphics screen to the other. An additional key can be used in conjunction with a home row key to accelerate the cursor's displacement on the graphics screen. However, the use of such a key further complicates the operation of the home row key, requiring the computer user to manipulate yet a third key.

Moreover, precise positioning of the cursor is difficult because the cursor responds to any application of an applied force. That is, the cursor responds to the application of a constant force, of an increasing force and of a decreasing force. Thus, in order to home in on a particular target on the graphic screen, the user must control both the acceleration (resulting from a positive force gradient applied to the home row key) and the deceleration (resulting from a negative force gradient applied to the home row key) of the cursor. Consequently, some users find such a system difficult to operate and constantly "over shoot" a desired target location on the graphic screen.

Furthermore, the small top surface area of the home row key, typically about one square centimeter, provides little tactile feedback with regard to the direction imposed on the cursor. Finally, the home row key requires its own software driver to interface with graphic environments or other application software systems.

SUMMARY OF THE INVENTION

The present invention comprises a fingerpoint mouse for use with a computer system having a graphical visual display. The mouse comprises a housing and a movable recess supported by the housing. The housing is constructed to receive a finger of a user. Sensing circuitry is included to sense the motion of the recess caused by movement of the finger and to generate a signal indicative of said motion. Conversion circuitry converts the signals indicative of the motion of the recess into signals suitable to effect motion of a graphics cursor on the visual display.

Preferably, the recess comprises an elastic material. Also preferably, the sensing circuitry comprises a source of light coupled to the recess so that light generated by the source of light moves when the recess moves. A plurality of photosensitive cells sense light from the source of light when the light is caused to move by movement of the recess.

Preferably, the plurality of photosensitive cells comprises four cells disposed in an orthogonal array such that a respective one of the cells senses light when the finger moves in one of four orthogonal directions. The orthogonal directions correspond to movement of the graphics cursor up, down, left and right on said graphical visual display.

In the preferred embodiment, each photosensitive cell generates an active output signal when light from the light source is incident on the photosensitive cell. The recess has a rest position when no pressure is applied to the recess. The light source is positioned so that when the recess is in the rest position, no light from the light source is incident on any of the photosensitive cells and no active output signal is generated.

Exemplary embodiments of the present invention include at least one switch to provide a signal having an active state and an inactive state. The switch is operable by a finger of the user.

BRIEF DESCRIPTION OF THE DRAWINGS

FIG. 1a is a perspective view of the fingerpoint mouse constructed in accordance with one embodiment of the present invention.

FIGS. 2a-2c are schematic cross-sectional views of the fingerpoint mouse of FIG. 1a taken along a line 2—2, when the user is not applying pressure to the fingerpad (FIG. 2a), is applying pressure in the "up" direction (FIG. 2b), and is applying pressure in the "down" direction (FIG. 2c).

FIG. 2d is a schematic cross-sectional view of the fingerpoint mouse of FIG. 1a taken along a line 2—2 which shows an alternative embodiment of the invention wherein a lucite lens is affixed to the photodiode.

FIG. 3 is a plan view taken from a line 3—3 in FIGS. 2a-2c of the photo-voltaic array used in accordance with the present invention.

FIGS. 7a-7d illustrate a flowchart which details the method used by the keyboard controller to convert signals generated by the fingerpoint mouse into conventional mouse data.

DETAILED DESCRIPTION OF THE INVENTION

Figure 1B:
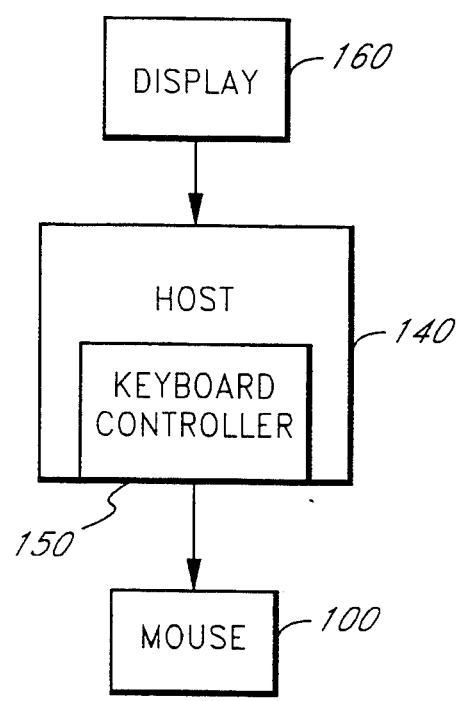
FIG. 1b is a block diagram which shows the main components of the computer system used in accordance with the fingerpoint mouse of the present invention.

FIG. 1a is a perspective view which shows a fingerpoint mouse 100 constructed according to one embodiment of the present invention. The fingerpoint mouse 100 comprises a generally rectangular housing 110, having push buttons 114, 116, and an elastic fingerpad 120. The fingerpad 120 has a fingertip-sized depression 125 formed therein. A data transmission line 130 extends from the mouse 100 to a mouse serial input port of a host computer system 140 (FIG. 1b).

The housing 110 of the mouse 100 is constructed from high-impact resistant, injection-moldable plastic in one embodiment, although it will be understood that a variety of manufacturing techniques may be used to form the housing 110. In one contemplated embodiment, the housing 110 is approximately 1 inch long by 0.75 inch wide by 0.4 inch deep. Thus, the mouse 100 is compact and portable to facilitate use of the mouse 100 in laptop and portable computer applications where there may be very little flat surface space available. The fingerpad 120 preferably comprises a flexible material such as a durable rubber, and is attached to the housing 110 with an epoxy or other suitable adhesive. The depression 125 advantageously has a size and configuration generally conforming to the tip of a human index finger. Thus, the depression 125 is suitable to comfortably retain a user's finger. In one embodiment, the depression 125 is approximately 0.1-0.15 inch deep and 0.4-0.5 inch long.

FIG. 1b is a block diagram which shows the main structural components used in accordance with the fingerpoint mouse 100. The mouse 100 communicates with the host system 140 through a keyboard controller 150. The host system 140 may, for example, comprise a PC based upon the Intel ® 80386/80486 microprocessor, or the like, such as an AST Premium Exec notebook computer. The keyboard controller 150 may be a microprocessor based controller such as a MIKI controller produced by AST, Inc. The host system 140 communicates with a display terminal 160, which includes a display screen capable of generating visual graphics. The fingerpoint mouse 100 may also operate in conjunction with other programmable display systems requiring cursor control.

Figure 1C:
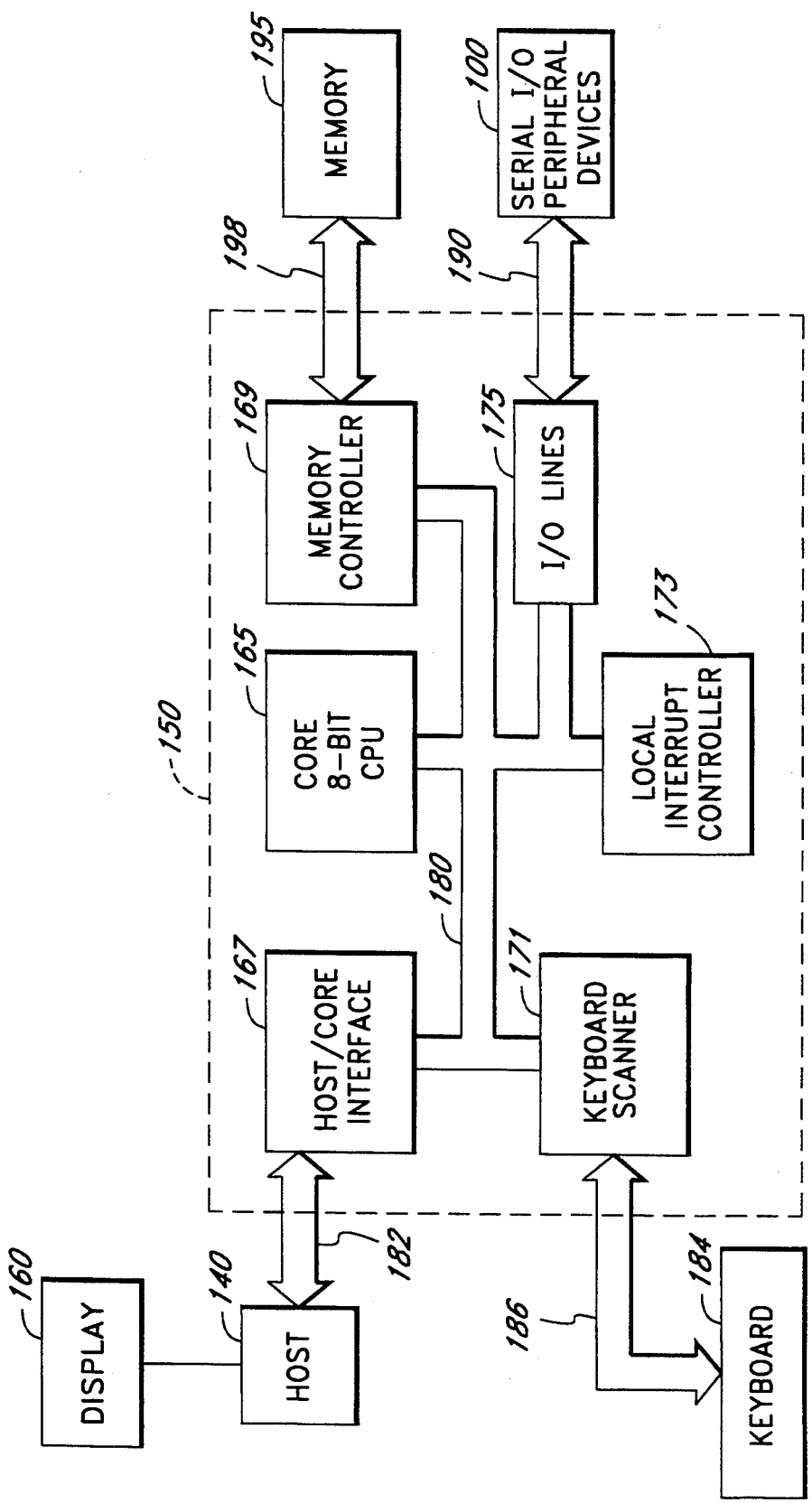
FIG. 1c is a block diagram which details the main functional elements of one keyboard controller used in accordance with the present invention.

FIG. 1c is a block diagram which details the major functional elements of one embodiment of the keyboard controller 150. The keyboard controller 150 has a core 8-bit CPU 165, a host/core interface 167, a memory controller 169, a keyboard scanner 171, a local interrupt controller 173, and input/output lines 175. These elements are interconnected by means of an internal bus 180. The Intel 80C51SL AG keyboard controller and the AST Research, Inc.'s MIKI keyboard controller are examples of appropriate keyboard controllers that may be used in computer systems which utilize the keyboard controller as an interface between a mouse and the operating system.

The keyboard controller 150 connects to the host computer 140 via an input/output bus 182. The input/output bus 182 includes the input and output connections to I/O ports 60 (hex) and 64 (hex) (i.e., the conventional input and output ports) of the keyboard controller 150, as well as an interrupt connection line (not shown), which is connected to the interrupt request terminal of an interrupt controller (also not shown) within the host 140. The I/O ports 60 and 64, as well as the interrupt controller are conventional and are well known in the art. The keyboard controller 150 may also connect to a keyboard 184 via signal lines 186, and to the mouse 100 via signal lines 190.

The memory controller 169 further connects to a memory 195 via signal lines 198. Although the memory 195 is shown in FIG. 1c as being external to the keyboard controller 150, it should be understood that the memory 195 may also be internal to the keyboard controller 150. The keyboard controller 150 executes instructions stored in the memory 195.

In operation, the fingerpoint mouse 100 allows a user to direct a graphics generated pointer, or cursor, to a selected region of the display screen 160. In order to control the motion of the cursor on the display screen 160, the user inserts the tip of the index finger into the depression 125. By applying pressure to the fingerpad 120 in a given direction, the user causes the cursor to move in that direction on the display screen 160. In one advantageous embodiment, the speed of the cursor is a function of the length of time that the user applies pressure to pad 120 (e.g., the cursor speed increases the longer the user applies pressure). The mouse 100 transmits data to the keyboard controller 150. The data which the mouse 100 transmits is indicative of the direction of the pressure which the user applies to the fingerpad 120. The keyboard controller 150 includes circuitry or software which converts the data from the mouse 100 into conventional trackball mouse data (i.e., data output by conventional trackball mouse pointers). This data includes x and y position values as well as data indicating whether either of the buttons 114, 116 is depressed. Thus, the fingerpoint mouse 100, in conjunction with the keyboard controller 150, emulates conventional mouse data so that signals received by the host 140 are indistinguishable from signals produced by conventional trackball mouse pointers. Mouse driver software in the host 140 receives the data from the keyboard controller 150 and generates a command which causes the cursor to move on the display screen 160 just as if a normal trackball mouse were transmitting data to the host 140.

FIGS. 2a–2c are schematic cross-sectional views of the mouse 100 taken along a line 2—2 in FIG. 1. FIG. 2a shows the mouse 100 prior to application of pressure by a user's index finger 200. The internal components of the mouse 100 shown in FIG. 2a include an infrared (IR) photo-diode 210 having power leads 212, a photo-voltaic array 220 supported by a photo-voltaic array plate 225, and output leads 230 extending from the array 220 to detector circuitry 240. The leads 212 and leads 245 extend to the host 140 (not shown here). An opaque plate 250 is also shown in FIG. 2a. The plate 250 attaches to, and covers, the center portion of the array 220.

In one embodiment, the photodiode 210 is a GaAs (gallium arsenide) diode, model number LD-261, commercially available from Siemens, and the photo-voltaic array 220 is implemented as model number BPX-79, also commercially available from Siemens. The LD-261 diode is advantageous due to its low profile and low power characteristics.

The fingerpad 120 supports the diode 210 and is advantageously double layered so that the portion of the leads 212 of the diode 210 extend within the fingerpad 120 between the layers of the fingerpad 120, as illustrated in FIG. 2a. A power source within the host 140 supplies power to the diode 210 via the power leads 212. When the diode 210 receives power, the diode 210 emits a beam of light 270 in the IR spectrum (e.g., at wavelengths in the range of 850–1000 nm). The light 270 is directed towards the photo-voltaic array 220. When no pressure is applied to the fingerpad 120 by the user, the diode 210 is aligned within the mouse 100 so that the light 270 emitted from the diode 210 impinges only upon the opaque plate 250. The plate 250 impedes the transmission of light so that the photo-voltaic array 220 does not sense the light 270. As a result, the photo-voltaic array 220 does not generate voltage signals, and the detector circuitry 240 remains dormant.

FIGS. 2b and 2c show cross-sectional views of the mouse 100 when the user applies pressure to the fingerpad 120 in the "up" and "down" directions respectively. In FIG. 2b, the user applies pressure in the "up" direction by means of the index finger 200. The applied pressure causes the elastic in the depression 125 to contract on one side and stretch on the other side so that the diode 210 is forced to tilt in the opposite direction of the applied pressure. The light beam 270 is therefore redirected onto the photo-voltaic array 220. In one embodiment, the photo-voltaic array 220 is angled slightly (e.g., about 8.5° with respect to the horizontal) towards the photodiode 210. This helps to ensure that the distance between the diode 210 and the surface of the array 220 does not increase significantly as the diode 210 is tilted. This is especially important in low power applications where the strength of the beam 270 may be a factor. The photo-voltaic array 220 senses the impinging light 270 and generates a voltage signal. The voltage signal is indicative of the direction of the pressure applied by the user's index finger 200, and is transmitted to the detector circuitry 240 via line 230. The detector 240 detects and decodes the voltage signal produced by the photo-voltaic array 220 and transmits the decoded signals to the keyboard controller 150 via the line 245. The keyboard controller 250 interprets the data from the mouse 100 and converts this data into conventional mouse data which may be utilized by the mouse driver software in the host 140. The method used to convert the signals transmitted from the finger point mouse 100 into conventional mouse data is described below in detail with reference to the flowcharts of FIGS. 6–7d. The host 140 receives the data from the keyboard controller 250 and effects a motion in the upward direction of the cursor on the display screen 160. Thus, the user is able to effect an upward motion of the cursor on the display screen 160 by simply applying forward pressure on the depression 125 of the fingerpad 120.

In FIG. 2c, the user applies pressure in the "down" direction by pulling on the depression 125 of the fingerpad 120. This pressure produces an effect similar to the application of pressure in the forward or "up" direction except that the diode 210 tilts to the opposite side so that the light 270 impinges on the opposite side of the array 220. The array 220 generates a voltage signal and this signal is decoded by the detector 240. Thereupon the detector 240 transmits signals to the keyboard controller 150 which indicate that the cursor is to be moved in the downward direction on the screen 160.

The keyboard controller 150 converts these signals into conventional mouse data so that the host 140 is able to use this data to produce a downward movement of the cursor on the screen 160. It should be noted that although the description above has been applied to cursor motion in the "up" and "down" directions, the description is equally applicable to the effecting of cursor motion in the right and left directions as well. As illustrated in FIG. 3, the present invention also includes a pair of cells oriented orthogonally to the two cells shown in FIGS. 2a–2d to detect light caused by movement of the fingerpad 120 in the left and right directions.

Yet another embodiment of the invention is shown in FIG. 2d wherein a lucite lens 290 attaches to the emitting portion of the photo-diode 210. The lucite lens 290 aids to increase the light intensity reaching the array 220 and to decrease the half angle of the beam 270 by focusing the light beam 270. The lucite lens 290 is preferably between 0.05 and 0.1 inch long in one embodiment.

FIG. 3 is a plan view of the array 220 and the plate 250 from the line 3—3 of FIGS. 2a–2c. The array 220 comprises four photo-voltaic cells 300, 302, 304, 306, arranged in a diamond pattern. The cells 300 and 302 correspond to the "down" and "up" directions respectively, while the cells 304, 306 correspond to the "left" and "right" directions respectively (i.e., light impinging on cell 300 generates a signal which is indicative of pressure applied in the "down" direction, light impinging on cell 304 generates a signal which is indicative of pressure applied to the fingerpad 120 in the "left" direction, etc.) It should be noted that the top photo-voltaic cell 300 corresponds to the down direction and the right cell 304 corresponds to the left direction, etc., because the photo-diode 210 always tilts in the direction opposite to the direction of the pressure applied by the user. The opaque plate 250 is also shown in FIG. 3 at the center of the photo-voltaic array 220.

Three light impingement regions 320, 324, 328 represent three cases of the regions on the surface of the array 220 where the light beam 270 may impinge. The first case, represented by the impingement region 320, is when the photo-diode 210 is at rest (i.e., when no pressure is applied to the fingerpad 120 as in FIG. 2a). In this case, the diode 210 emits the beam of light 270 so that impingement region 320 of the light 270 is entirely on the surface of the opaque plate 250. Thus, the half-angle of the beam 270, together with the distance between the diode 210 and the plate 250, should be such that the impingement region of the light beam 270 does not exceed the size of the plate 250. In one embodiment, the half-angle of the light beam 270 emitted by the photo-diode 210 is approximately 12.5° and the distance from the diode 210 and the plate 250 is about 0.1 inch. In this way, the opaque plate 250 serves to create a "dead" region at the center of the array 220 so that no cursor motion is effected by the mouse 100 when the user is not applying pressure to the fingerpad 120.

The second case, represented by the impingement region 324, is when the light beam 270 impinges upon the cell 300 as in FIG. 2c. In this case, substantially all of the light 270 from the diode 210 impinges on the cell 300 and is converted into a voltage signal by the photovoltaic cell 300. Each photo-voltaic cell 300, 302, 304, 306 includes a connecting lead which transmits a voltage signal produced by the respective cell 300, 302, 304, 306 to the detector 240 (FIGS. 2a–2d). Thus, if the detector 240 receives a signal from the line to the cell 300 this means that data should be sent to the keyboard controller 150 indicating that the cursor should be moved in the down direction on the screen 160.

The third case, represented by the region 328, is when the light beam 270 impinges upon two photo-voltaic cells (in this particular case the cell 300 and the cell 306) at one time. In this third case, both the cells 300, 306 generate voltage signals to indicate that light from the beam 270 is impinging upon their respective surfaces. Thus, the keyboard controller 150 receives data indicating that the cursor should move in the horizontal and the vertical directions simultaneously (i.e., down and to the right in the particular case shown in FIG. 3). In such cases where the light beam 270 impinges on two cells at once, the cursor moves at about 45° angle across the screen 160. Thus, the photo-voltaic array 220 provides an arrangement wherein eight directions of cursor movement are possible.

It should be understood that the size, shape and relative spacing of the cells 300–306 could be altered depending upon the particular application. For example, in one embodiment, the right and left cells 304, 306 may be slightly smaller than the cells 300, 302 so that when each of the four square cells 300–306 are tilted upwards at an angle of $8\frac{1}{2}°$, small spaces are still left between the edges of the cells 300–306. Also, it will be appreciated that rectangular or diamond shaped cells could be used instead of the square cells 300–306. Furthermore, one skilled in the art could easily modify the photo-voltaic array 220 to include 8 or 16 cells positioned circumferentially about the plate 250. One might even provide an outer ring of photo-voltaic cells which cause the cursor to move more quickly when light impinges on this outer ring. These and other obvious modifications to the array 220 will be apparent to one of ordinary skill in the art.

Figure 4:
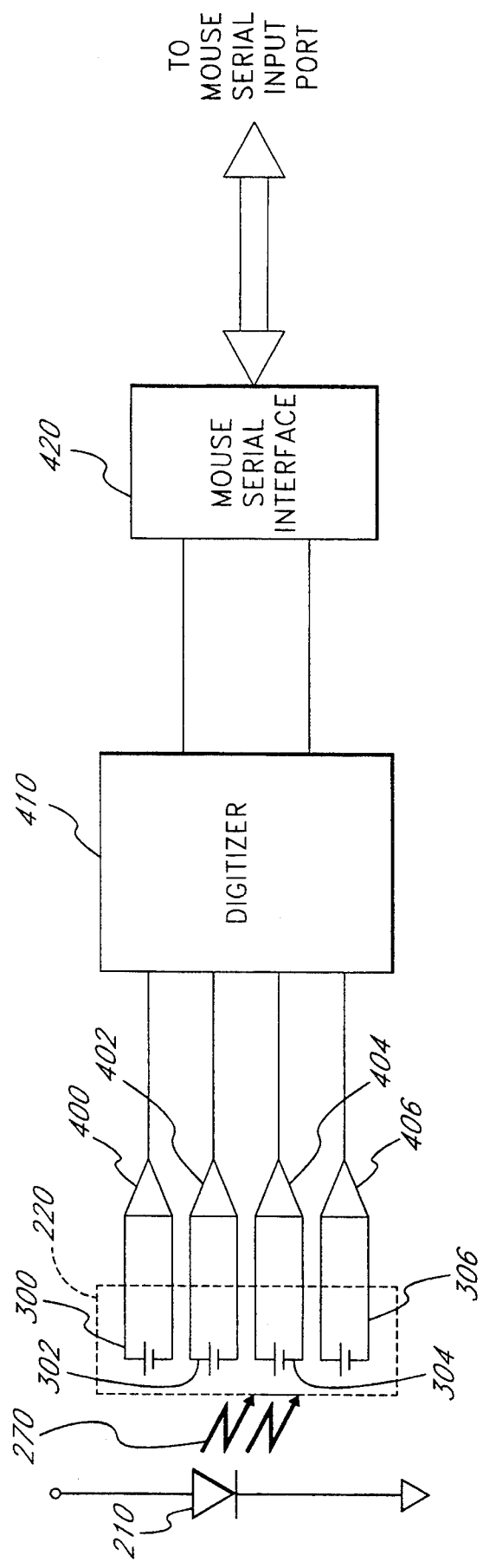
FIG. 4 is a schematic block diagram which shows the major functional circuit elements of a fingerpoint mouse constructed in accordance with the teachings of the present invention.

FIG. 4 is a schematic block diagram which shows the major functional circuit elements of the mouse 100. Shown in FIG. 4 are schematic representations of the photo-diode 210 emitting light energy 270 which the photo-voltaic cells 300–306 receive. The voltage signals produced by the cells 300–306 are transmitted to operational amplifiers (OP amps) 400–406 which correspond to the cells 300–306. In one embodiment, the OP amps 400–406 are 3.3 volt CMOS OP Amps commercially available from National Semiconductor or Texas Instruments. In one exemplary embodiment, the OP Amps preferably have a discrimination factor of about 125:1. The OP amps 400–406 amplify the voltage signals from the cells 300–306 and transmit the amplified signals to the input of a digitizer 410, which may, for example, comprise a TDA 8702 eight-bit analog-to-digital (A/D) convertor available from Signetics. It should be understood, however, that other suitable digitizing means may be employed such as a 74HC153 dual 4-line to 1-line encoder available from Texas Instruments which provides a single bit output for each of the photo-voltaic cells as the outputs from the OP amps are selected in sequence. The OP amps 400–406 and the digitizer 410 are the major functional elements of the detector circuitry 240 in one embodiment. The digitizer 410 communicates with a mouse serial interface circuitry 400 which in turn communicates with a serial mouse input port of the keyboard controller 150 (not shown here). Thus, the output of the mouse circuitry indicates which of the cells 300–306 is active and transmits this information to the keyboard controller 150. It should be understood that the mouse 100 need not be connected by means of a serial input port. One skilled in the art will appreciate that it is possible to configure the mouse 100 to connect via a PS/2 keypad port, or by a 4-pin connector which may be custom formed to connect to the appropriate terminals within the keyboard controller 150.

The circuitry used to indicate the depression of the left and right buttons 114, 116 (FIG. 1c) is conventional and will be well understood by one of ordinary skill in the art. Although this circuitry is not shown, it will be appreciated that the mouse 100 also includes such circuitry, and that data indicating the depression of the left or right buttons 114, 116 is also transmitted to the keyboard controller 150 from the mouse 100.

Figure 5:
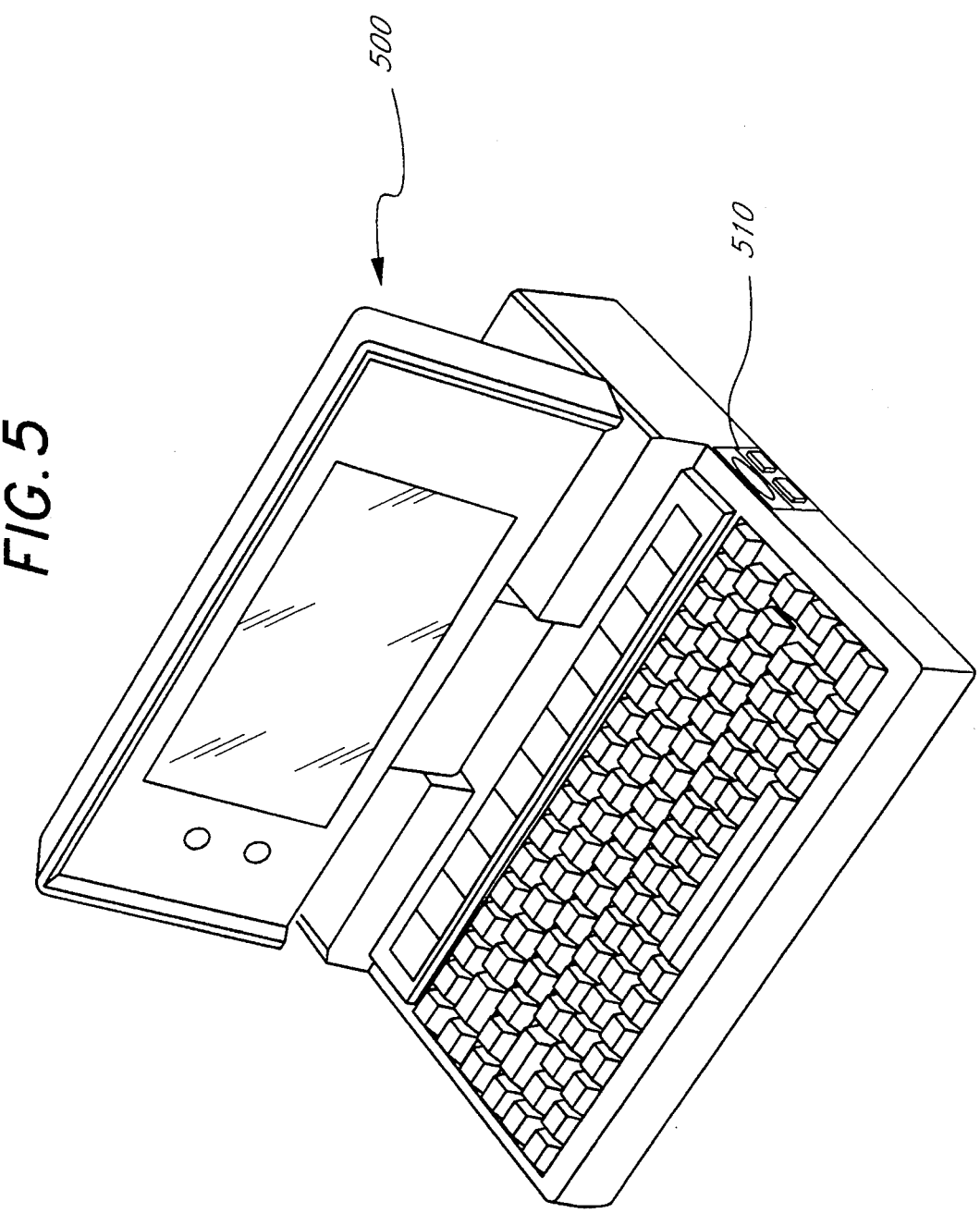
FIG. 5 is a perspective view of a notebook computer including an embodiment of the invention wherein the fingerpoint mouse is embedded within the side of the computer.

FIG. 5 shows an alternative embodiment of the invention wherein the fingerpoint mouse is incorporated into the structure of a laptop computer 500. A perspective view of the computer 500 is shown wherein an embedded mouse 510 is located on the right side of the computer 500. The embedded mouse 510 includes all of the circuitry, and performs in substantially the same functions as the mouse 100 in substantially the same way with the exception that the mouse is internally connected to the keyboard controller 150. In one embodiment, software within the keyboard controller 150 simulates the connection between the mouse 510 and the host 140 as though the mouse 510 were connected via a PS/2 keypad port (also known as a mouseport). That is, the keyboard controller 150 transmits signals to the host 140 which are identical to signals which the keyboard controller 150 would transmit to the host 140 if a conventional external mouse were connected at the mouseport. A left-handed embodiment of the embedded mouse 510 may also be provided as called for by the particular application.

Figure 6:
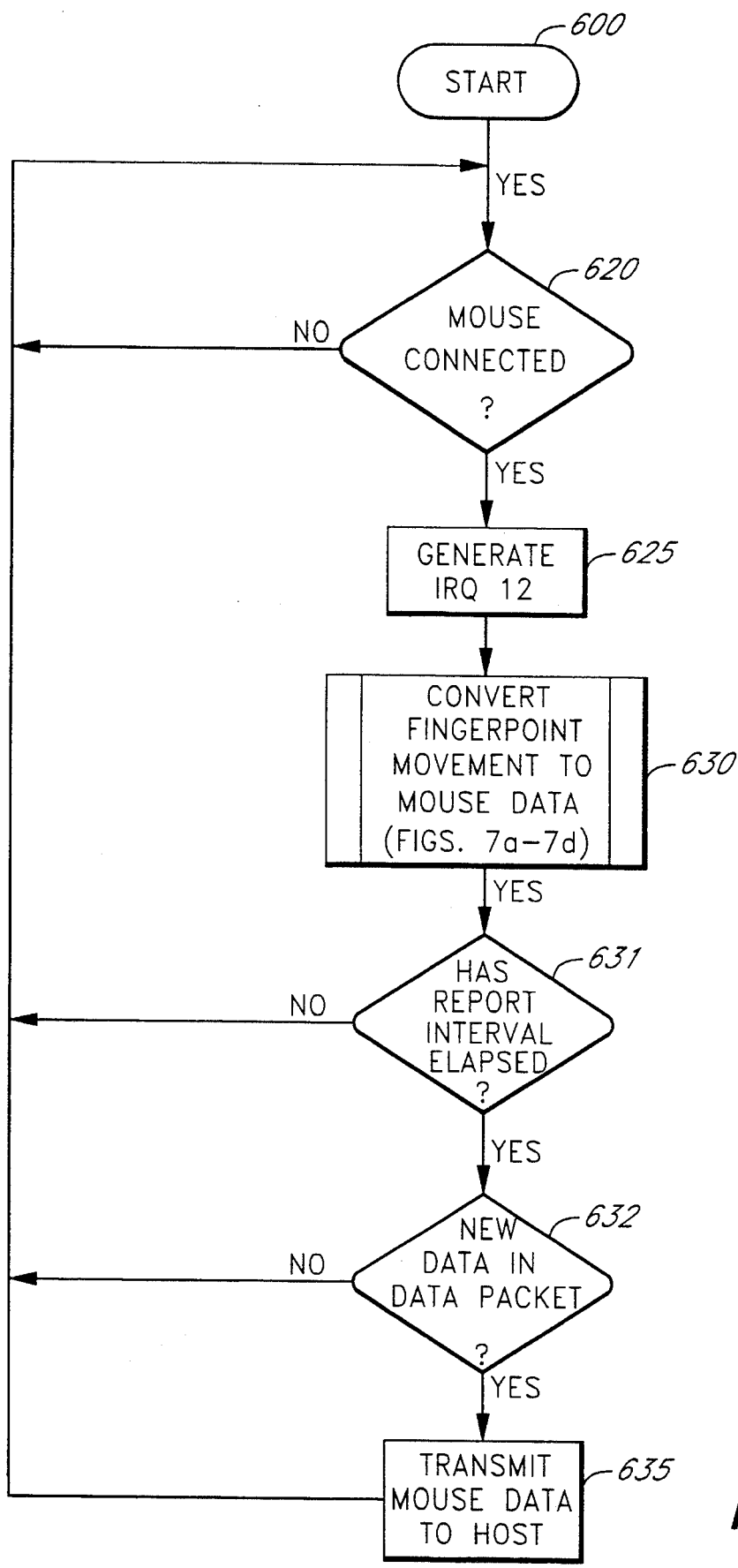
FIG. 6 is a flowchart which illustrates the general process employed by the keyboard controller to emulate and transmit conventional mouse data.

The general method used by the keyboard controller 150 to emulate mouse operations is described with reference to the flowchart of FIG. 6. Instructions controlling execution by the keyboard controller 150 to carry out the tasks of FIGS. 6–7d are stored in the memory 195 for the keyboard controller 150. The flowchart begins in a start block 600. Control of operations of the present invention begins at a decision block 620 wherein the keyboard controller 150 performs a test to determine if the mouse 100 is connected via the serial input port of the host 140. If the mouse 100 is not connected, then control returns to the beginning of the method. However, if the mouse 100 is connected, then control passes from the decision block 620 to a process block 625. At the process block 625, the keyboard controller 150 generates an interrupt request signal (e.g., an IRQ 1, or, in the embodiment of the embedded fingerpoint mouse 510, the generated interrupt is an IRQ 12). The keyboard controller 150 then transmits the interrupt request to the host 140. This indicates to the host computer 140 that the data from the keyboard controller 150 which follows will be mouse data. As is well known in the art, the host 140 will then execute a routine (a mouse driver) activated by the interrupt signal to process the incoming mouse data. Control then passes from the process block 625 to a subroutine block 630, wherein the signals from the fingerpoint mouse 100 are processed and converted into conventional mouse data. This is advantageously accomplished by means of the core CPU 165 (FIG. 1c). In other words, the core CPU 165 executes instructions in the memory 195 to process the data received from the keys and generate conventional mouse data.

The method employed within the subroutine block 630 is described in greater detail with reference to the flowchart of FIGS. 7a–7d below. Once the keyboard controller 150 generates the appropriate mouse data at the subroutine block 630, and an appropriate report (i.e., sample) period elapses, as represented in a decision block 631, the keyboard controller transmits mouse data to the host 140, as represented in an action block 635. If the appropriate report period has not elapsed, however, control returns to the start of the method. Since the keyboard controller 150 transmits mouse data in packets, as is well understood in the art, the action block 632 represents a decision whether any new data is available in the packet. For instance, a decision is made whether the state of a mouse button 114, 116 has changed or the mouse moved since the last data was sent to the host 140. If no change has occurred in the packet awaiting transmission to the host 140, then the packet need not be transmitted.

Because the interpretation of the signals transmitted from the mouse 100 is controlled by the keyboard controller 150, the creation of conventional mouse data is effectively transparent to the operating system of the host 140. In other words, the operating system of the host 140 simply receives data indicating mouse movement and control as if the data originated from a conventional mouse.

In order to receive and process the conventional mouse data correctly, the host computer 140 is advantageously equipped with mouse driver software. Because in the present embodiment the keyboard controller 150 emulates a conventional PS/2-compatible mouse connected to a conventional mouseport, the mouse driver software of the host 140 which processes the mouse data provided by the keyboard controller 150 is a conventional PS/2 mouse driver, and is well known in the art. For example, appropriate mouse drivers which may be used in accordance with the present invention can be obtained from Microsoft.

The mouse driver is typically a terminate and stay resident (TSR) program which is installed in the host computer 140. After installation, the TSR program remains within the memory of the host 140 but does not execute until specifically activated. Thus, the program is transparent during normal operation of the host computer 140. The TSR program is activated by an interrupt signal (IRQ 12) generated by the keyboard controller 150 and applied to the input terminal of the interrupt controller (not shown) within the host 140. The interrupt controller instructs a central processing unit within the host computer 140 to address the memory location where the mouse driver program is located in host memory. The mouse driver program then processes the mouse data from the keyboard controller 150 as if the data were from a conventional mouse pointing device.

It should be noted that, although the flowchart of FIG. 6 is described as though it represents a continually executing process, the process is advantageously interrupt driven. That is, once any key is pressed, an interrupt is generated to signal the local interrupt controller 173 of the keyboard controller 150. The local interrupt controller 173 then activates the process outlined in the flowchart of FIG. 6.

Figure 7B:
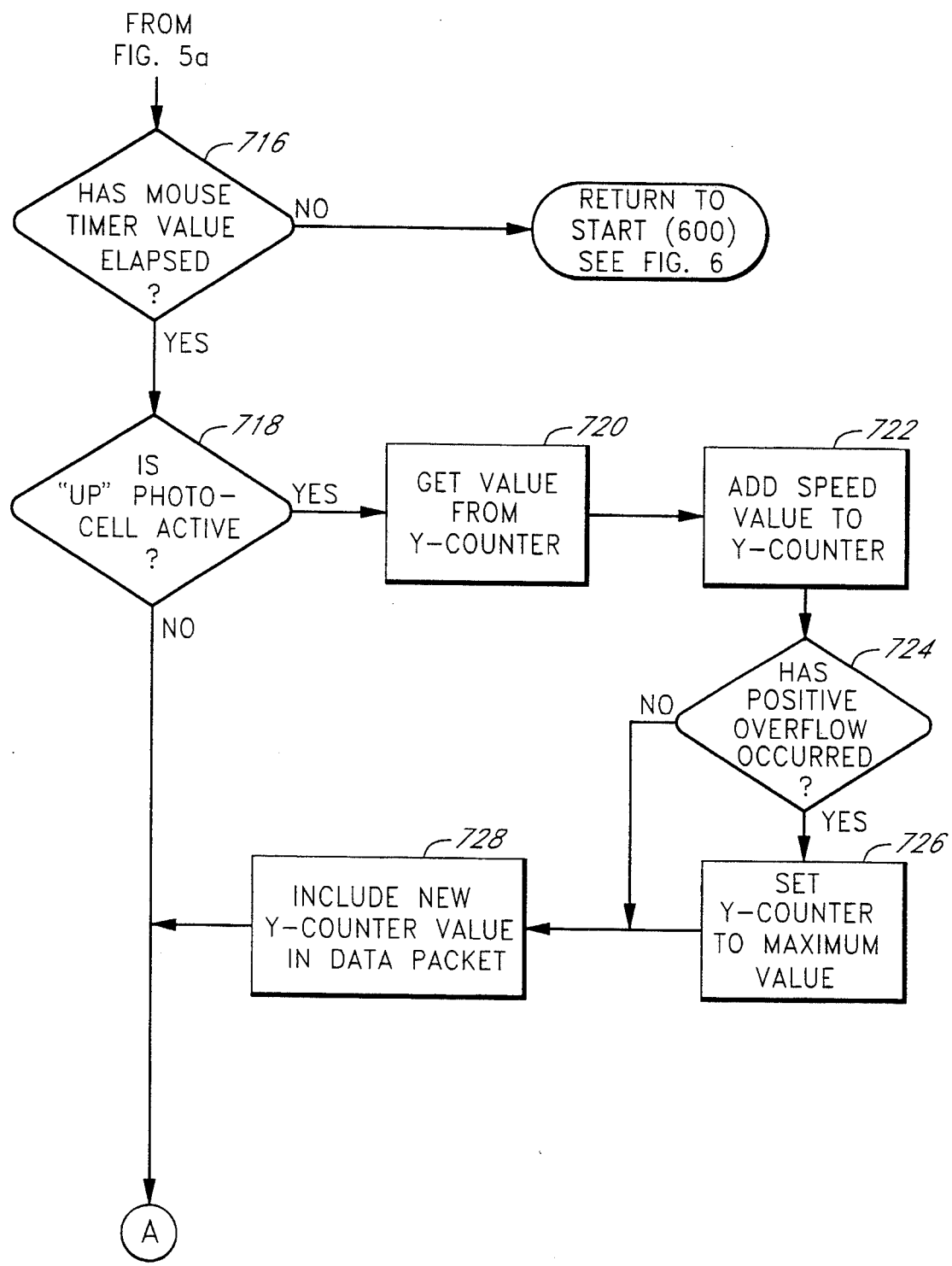
Figure 7C:
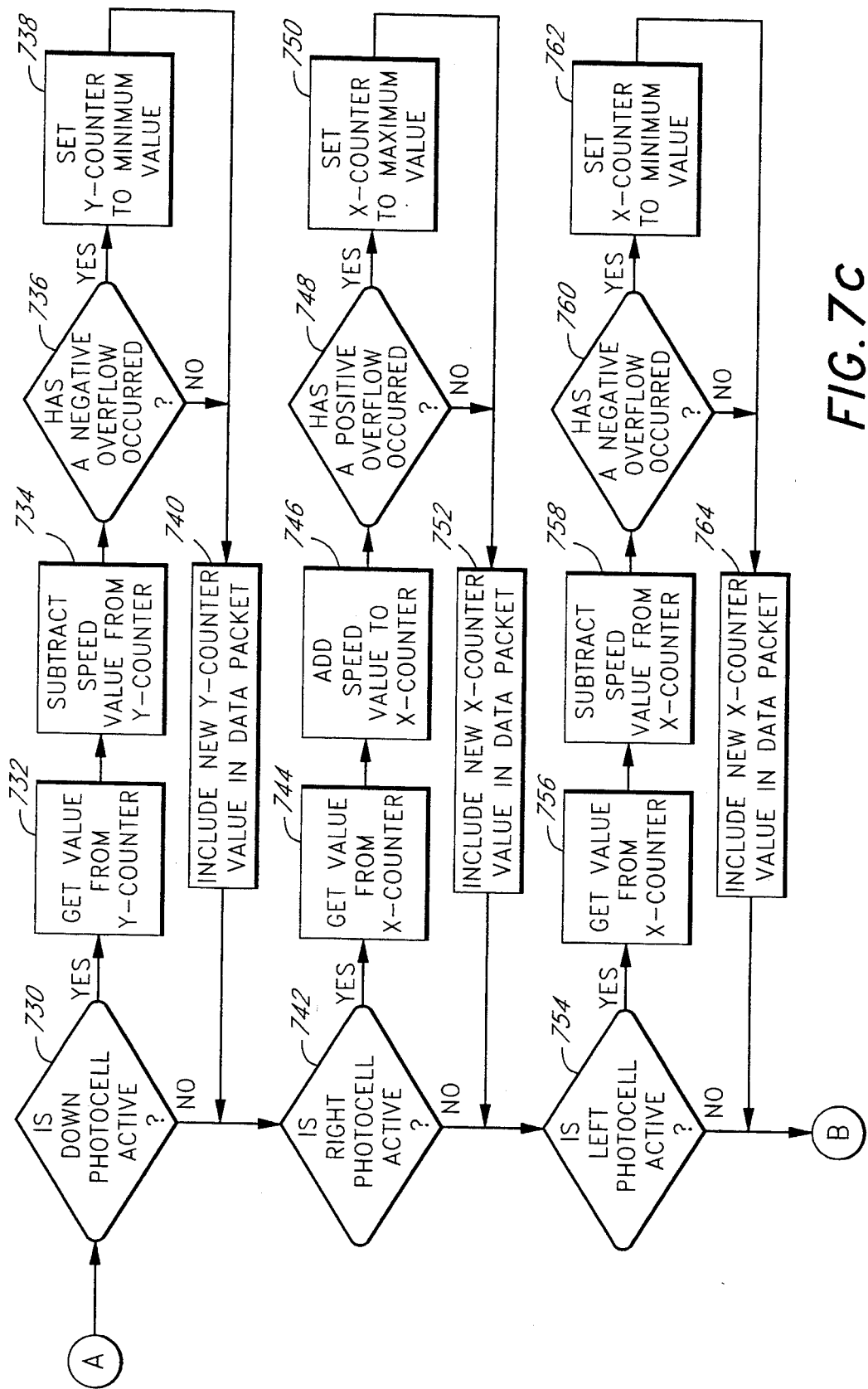
Figure 7D:
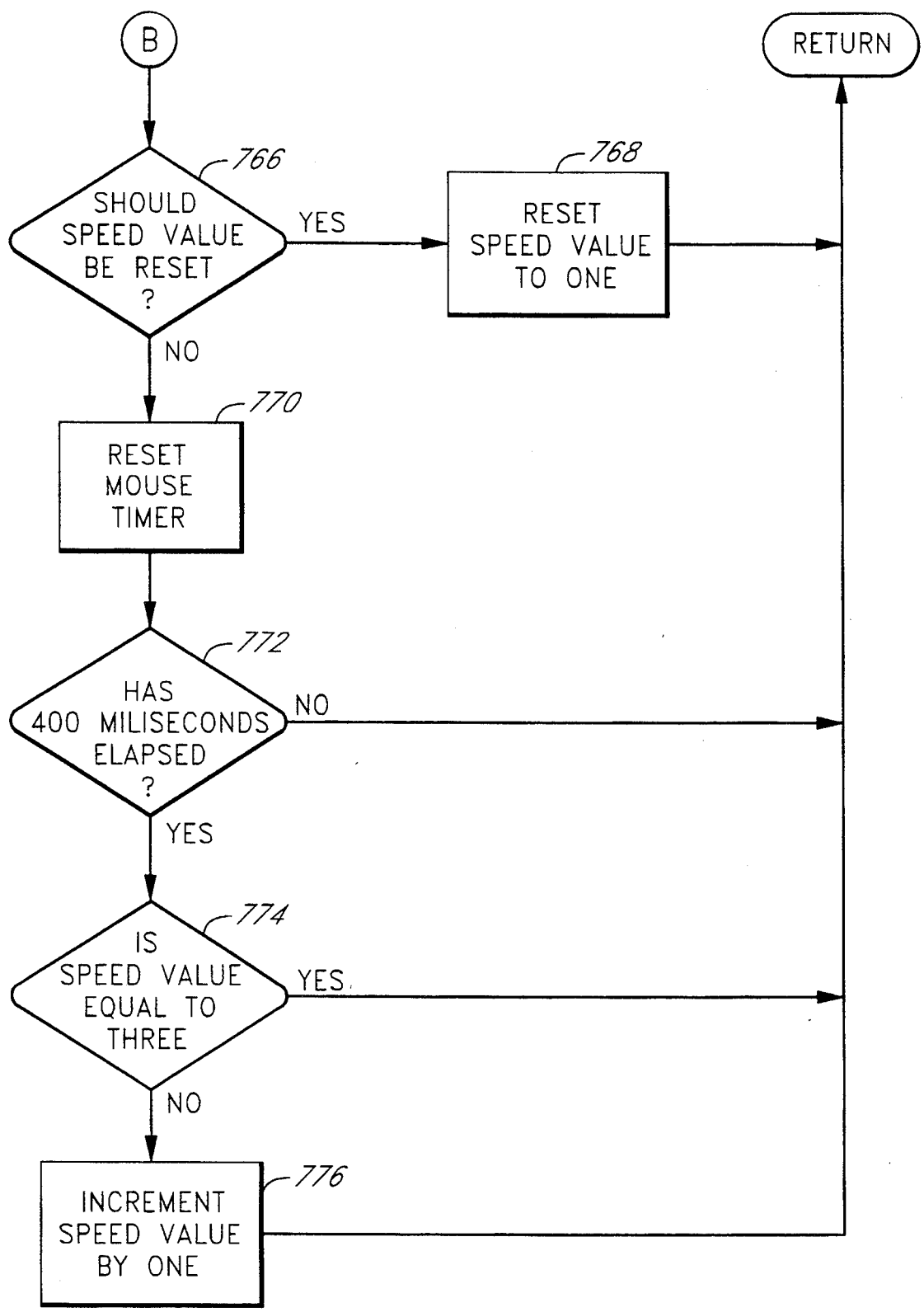

The flowchart of FIGS. 7a-7d details the process represented by the subroutine block 630 (i.e., the process of generating mouse data for the host 140). As illustrated in FIG. 7a, the routine begins at a start block 700. Initially, the keyboard controller 150 determines whether the mouse is disabled as represented in a decision block 702.

In conventional systems, the operating system (of the host 140) performs two tests to determine if a mouse is connected to the system. The first test determines whether or not a mouse is attached to the mouseport. If a mouse is connected to the mouseport, the mouseport takes precedence, and a serial mouse is normally ignored. If no mouse is connected to the mouseport, the operating system performs a second test to determine whether a serial port mouse is being used. This sequence of operation of the host 140 does not normally present a problem when the mouse 100 is connected via the serial input port of the host 140. However, the use of the embedded fingertip mouse 510 (FIG. 5) of the present invention in combination with an additional serial port mouse would normally result in the serial port mouse being ignored. This is because the present invention emulates a mouse connected to the mouseport in the embodiment where the embedded mouse 510 is implemented, and the system would always ignore a serial port mouse because the embedded fingertip mouse 510 would always indicate the presence of a mouseport mouse.

However, if a serial port mouse is connected, presumably, the user may desire to use the serial port mouse rather than the embedded fingertip mouse 510. In order to solve this difficulty, the present invention provides an option list for the user during set-up operations of the computer. The list of selections during set-up is as follows:

---
none
serial port 1
serial port 2
mouseport
---

The user selects, during set-up of the computer system 140, which type of mouse is desired. If the user selects a serial port mouse at set-up, then this sets a fingertip mouse disable bit. The test performed by the keyboard controller 150 in decision block 702 determines whether this disable bit has been set. If the disable bit has been set, then the fingertip mouse emulator is disabled and control returns to the beginning of the routine (e.g., the start block 600 of FIG. 6). If the fingertip mouse emulator is not disabled, then the keyboard controller 150 proceeds to interpret data transmitted by the mouse 100. The data provided by the keyboard controller 150 are stored in conventional mouse data packets. It should be understood that the disable option is only necessary for implementations of the present invention wherein the keyboard controller 150 emulates a mouse connected at the mouseport (e.g., the embedded fingertip mouse 510). Thus, the preceding list of options and the corresponding disable bit are not necessary in implementations where the keyboard controller emulates a mouse connected at one of the serial input ports (e.g., the fingertip mouse 100).

In one embodiment, each data packet comprises three bytes of binary data and has several fields. For example, some fields of the data packet contain data indicating the state (inactive or active) of the left button 114 or right button 116, fields contain a number of X and/or Y counts (i.e., increments of directional movement in the X and/or Y directions, as utilized by the mouse driver to move the cursor on the screen) and fields contain data indicating whether an overflow has occurred in the X counts or Y counts.

A new data packet is sent to the host 140 periodically at time intervals (the report interval) determined by a value contained in a programmable register (the Report Interval register) within the keyboard controller 150. The value within this register effectively regulates the sample rate of the system (i.e., the rate at which the host 140 receives mouse data packets). In one embodiment, the sample rate ranges from 10 data-packets per second to 200 data-packets per second, and the register values assigned in the present embodiment correspond to sample rates as shown in the table below:

| Report Timer Register Value | Sampling Rate |
| --- | --- |
| 20 | 10 data-packets/sec |
| 10 | 20 data-packets/sec |
| 5 | 40 data-packets/sec |
| 4 | 60 data-packets/sec |
| 3 | 80 data-packets/sec |
| 2 | 100 data-packets/sec |
| 1 | 200 data-packets/sec |

In the present embodiment, the Report Interval register value indicates the number of times the keyboard controller 150 passes through the control program illustrated in FIG. 6 before a packet is transmitted to the host 140. Thus, the rate at which data packets are sent to the host 140 may be changed by simply changing the Report Interval register value.

In some applications it is advantageous to automatically regulate the sample rate in response to the needs of the system. For instance, if the majority of the data packets ready to be transmitted to the host 140 over a given time interval contain very little mouse data, then a high sampling rate wastes computer time by sending data packets with very little or no data. Conversely, if many data packets to be sent over a given time interval contain the maximum data possible in the packets, then a low sampling rate may result in lost data. Thus, in accordance with one embodiment of the present invention, the sampling rate is regulated periodically in response to the number of data overflows for packets transmitted to the host 140 within a given time interval.

If the mouse is not disabled (decision block 702), interpretation of the data transmitted by the mouse 100 begins in the decision block 704 of FIG. 7a. At the decision block 704, a test is performed to determine if the left button 114 is pressed. If the left button 114 is pressed, then control passes to a decision block 706.

Typically, one bit in each data packet represents the state of the left button 114. In the present embodiment, the state of this bit stays the same for consecutive packets in accordance with the last change of this bit. Therefore, at the decision block 706, the keyboard controller 150 performs a test to determine if the left button 114 has changed state since the last test. If the left button 114 has not changed state since the last test, this indicates that the user was holding the left button 114 down during the last pass through this procedure, and the bit in the data packet reflecting the state of the left button 114 need not be changed in the next packet sent to the host 140. Thus, control passes to a decision block 710. However, if the left button 114 has changed state since the last test, this indicates that the user has just activated the left button 114 and the bit in the next data packet which reflects the state of the left button 114 should be set. When the packet is sent to the host 140, the mouse driver interprets the bit to determine that the left button 114 of the mouse 100 was just depressed. Thus, control passes to a process block 708, and data indicating that the left mouse button 114 switch state has changed to "closed" is placed into a data packet (i.e., the left button 114 state bit is set in the present embodiment). Additionally, the keyboard controller 150 sets a "packet changed" flag (not part of the mouse data packet) which indicates to the keyboard controller 150 that the data packet has changed. Thereafter, control passes to the decision block 710.

If, the left button 114 is not pressed (not currently active (decision block 704)), the keyboard controller 150 again determines if the state of the left button 114 has changed since the last test (i.e., changed from closed to open). As explained above, this is because the next data packet to the host 140 will represent the previous state of the left button 114. Therefore, if a change has occurred, the appropriate bit should be altered. Accordingly, the keyboard controller 150 determines if the state has changed since the last test, as represented in a decision block 707. If the state has not changed since the last test (i.e., the left button 114 was inactive during the last test), then the keyboard controller 150 proceeds to determine if the right button 116 is pressed, as represented in an action block 710. If, however, the state of the left button 114 has changed since the last test (the decision block 707), this indicates that the left button 114 was active during the last test and is now inactive. Therefore, the keyboard controller 150 changes the left switch state bit in the data packet to reflect the new inactive state, as represented in action block 709 (i.e., the keyboard controller 150 clears the bit in the data packet, which represents the state of the left button of a mouse), and sets the "packet changed" flag.

Once any information indicating that the left button 114 has changed state is included within the data packet, the keyboard controller 150 determines if the right button 116 is currently active, as represented in the decision block 710. If the right button 116 is active, then control passes to a decision block 712, and a determination is made whether the state of the right button 116 has changed since the last test. If the right button 116 has not changed state since the last test, this indicates that the user was holding the right button 116 down during the last execution of the subroutine, and a bit in the packet representing the state of the right mouse button already represents the current state. Thus, control passes to a decision block 718 (FIG. 7b). However, if the right button 116 has changed state since the last test, this indicates that the user has just activated the right button 116, and the bit in the data packet, which represents the state of the right button 116 should be set. This will indicate to the host 140 (via the mouse driver) that the right button 116 of the mouse 100 was just activated. Therefore, control passes to a process block 714, and the keyboard controller 150 sets the bit in the current data packet indicating that the state of the right button 116 has changed to closed (i.e., a bit is set in the data packet currently being constructed for transmission to the host 140). In addition, the keyboard controller 150 sets the "packet changed" flag. Thereafter, control passes to the decision block 718 (FIG. 7b).

As explained above, the keyboard controller 150 of the present invention interprets the data transmitted by the mouse 100 to emulate the operation of a mouse connected to the serial input port, or the data transmitted by the embedded fingertip mouse 510 to emulate the operation of a mouse connected to the mouseport. Accordingly, when the keyboard controller 150 determines that the right button 116 has been activated, the data which is stored in the data packet currently being constructed for transmission to the host 140 is the same data which would be generated if a mouse were actually connected to the serial input port or the mouseport respectively.

If the keyboard controller 150 determines that the right button 116 is not active (the decision block 710), then the keyboard controller 150 then determines if the state of the right button 116 has changed since the last test, as represented in an action block 713. If the state of the right button 116 has not changed since the last test, then the bit which represents the state of the right button of a mouse in the next packet to be sent to the host 140 already represents the open or inactive state of the right mouse button 116, and control passes directly to the decision block 718 (FIG. 7b). If the state of the right button 116 has changed since the last test (the decision block 713), this indicates that the user released the right button 116 since the last execution of the subroutine. Accordingly, the keyboard controller 150 changes the state of the bit in the data packet which represents the right button of the mouse to open or inactive (i.e., it clears the corresponding bit), as represented in an action block 715, and sets the "packet changed" flag. Thereafter, control passes to the decision block 718 (FIG. 7b).

Once the keyboard controller 150 has processed data from the left button 114 and the right button 116, the keyboard controller 150 proceeds to process the emulated movement of the mouse 100 via the signals provided by the photo-voltaic cells 300–306. Blocks 718–764 (FIGS. 7b and 7c) illustrate the operation of the cursor movement photo-voltaic cells 300–306. The procedure for converting the data obtained from these cells 300–306 into mouse data is generally the same for each cell, so that the same method is repeated for the up (302), down (300), right (306) and left (304) photo-voltaic cells.

Before the keyboard controller 150 checks the photo-voltaic cells 300–306, the keyboard controller 150 checks a Mouse Timer value, as represented in a decision block 716. The Mouse Timer value indicates the frequency at which the X-count value and the Y-count value are incremented or decremented. As will be discussed in greater detail below, the X-count value and Y-count value are values transmitted by the fingerpoint mouse 100 that indicate the horizontal and vertical distances respectively that the cursor is to be moved on the video display screen. In the present embodiment, the Mouse Timer value acts as a test value or delay time before the keyboard controller 150 proceeds through the photo-voltaic cell detection routine and again increments or decrements the X-count value or the Y-count value, as may be the case. In one embodiment, the Mouse Timer value may be set to 12.5, 25, 50 or 100 increments/decrements of the Y-count and X-count per second. In other words, the Mouse Timer value determines a Mouse Timer period. The Mouse Timer period is the amount of time assigned for each pass through the routine which converts the signals detected from the photo-voltaic cells 300–306 into mouse data. The X-count value and Y-count value are incremented/decremented when appropriate during each Mouse Timer period. The increments/decrements per second (Mouse Timer) value is advantageously set during set-up operations. However, it should be noted that the procedure employed in accordance with the present invention could allow a user to update the Mouse Timer value at any time during the operation of the system. The Mouse Timer value performs a function similar to resolution in a conventional mouse.

If the Mouse Timer has not elapsed, control returns to the beginning of the routine. If the Mouse Timer has elapsed, the keyboard controller 150 checks the photo-voltaic cells 300–306, beginning with a decision block 718.

Within the decision block 718, the keyboard controller 150 first determines if the up cell 302 is currently illuminated by the photo-diode 210 (active). If the up cell 302 is not active, then the keyboard controller 150 begins processing the data from the down cell 300, beginning at a decision block 730 (FIG. 7c), through a continuation point A. However, if the up cell 302 is active (as determined at the decision block 718), then control passes from the decision block 718 to a process block 720, and the keyboard controller 150 retrieves a current value of a Y-counter. The Y-counter contains the Y-count value which is related to the vertical distance that the cursor is to be moved on the computer screen 160. The Y-counter value (as well as an X-counter value, explained below) maintains a running count total of the movement of the cursor since the last packet was sent to the host 140. These counters are cleared each time a packet is sent to the host 140, and begin incrementing and/or decrementing with mouse movement (i.e., upon the detection of active photo-voltaic cells 300–306) until the next packet is sent to the host 140.

Once the Y-counter value has been retrieved in the process block 720, control passes to a process block 722, and a current "speed" value is added to the value within the Y-counter and replaces the original Y-counter value. The "speed" value may assume a value of one, two or three in the present embodiment, and is used to adjust the rate at which the cursor moves across the screen 160. Since the value of the Y-counter is directly proportional to the distance the cursor moves up or down the computer screen 160, and the Y-counter is incremented or decremented by the speed value every time through the subroutine loop while the up or down photo-voltaic cells 302, 300 are active, the rate at which the cursor moves across the screen 160 is proportional to the speed value. For example, if the speed value is set to one, then each time through the loop while the up cell 302 remains active, the keyboard controller 150 increments the Y-counter value by a value of one until the speed value is changed. If the speed value is set to three, then the Y-counter value will be incremented by three each time through the loop while the up cell 302 remains active. Thus, the Y-counter value increases three times as fast when the speed value is set to three as when the speed value is set to one. Once the speed value has been added to the Y-counter value of the process block 722, control passes to a decision block 724.

At the decision block 724, a determination is made whether a positive overflow has occurred in the Y-counter. If a positive overflow in the Y-counter has not occurred, control passes to a process block 728. However, if a positive overflow has occurred in the Y-counter, this indicates that the Y-counter value has exceeded its maximum value (e.g., 127 in the present embodiment). Control therefore passes to a process block 726, and the Y-counter is set to its maximum value. A Y-overflow flag (e.g., a single bit) is also set in the current mouse data packet, indicating a Y-counter overflow has occurred.

Either directly from the decision block 724, or after the process block 726, control passes to the process block 728, and the keyboard controller 150 replaces the previous Y-counter value in the current data packet with the new Y-counter value. The keyboard controller 150 also sets the packet-changed flag.

It is possible for the Y-counter value to be incremented and/or decremented several times before its value is transmitted to the host 140 in a data packet. Therefore, it is advantageous to transmit data packets at a rate concordant with the incrementing rate of the Y-counter. For example, if a data packet is sent so infrequently that the Y-counter overflows and is reset to its maximum value several times before the data packet is sent, then the speed of the cursor on the computer screen 160 will not accurately reflect the rate at which the Y-counter is being incremented. Hence, there will be little or no difference if the speed value is set to one, two, or three. Thus, it is advantageous if the rate at which the data packets are sent is correlated relative to the speed value.

The likelihood that the Y-counter value will exceed its maximum value therefore depends upon the report interval (i.e., the sample rate at which packets are sent to the host computer 140) and the speed value. If the Y-counter value exceeds its maximum value on numerous occasions in a given time interval, this indicates that the sample rate is probably too slow. In one embodiment, the keyboard controller 150 monitors the number of times the Y-counter value exceeds its maximum value (i.e., the number of overflows) during a given interval, and increases the sample rate by a predetermined increment until the Y-counter value does not exceed its maximum (e.g., overflow) during the predetermined interval.

Once the new Y-counter data has replaced the previous Y-counter value in the data packet (action block 728), control passes to the decision block 730 (FIG. 7c) through the continuation point A. At the decision block 730, the keyboard controller 150 determines if the down cell 300 is currently active (i.e., if the cell 300 currently has light from the photodiode 210 impinging upon it). If the down cell 300 is not active, then the keyboard controller 150 begins processing the data transmitted from the right photo-voltaic cell 306, beginning with a decision block 742. However, if the down cell 300 is active, then control passes from the decision block 730 to a process block 732, and the keyboard controller 150 retrieves the current value of the Y-counter. Once the Y-counter value has been retrieved, control passes to a process block 734, and the keyboard controller 150 subtracts the current speed value (adds a twos complement value, as is well understood in the art) from the Y-counter value, and replaces the original Y-counter value. When the speed value has been subtracted from the Y-counter value (the process block 734), control passes to a decision block 736. At the decision block 736, the keyboard controller 150 determines if an overflow in the Y-counter has occurred in the negative direction. If a negative overflow in the Y-counter has not occurred, control passes to a process block 740. However, if the Y-counter has overflowed in the negative direction, this indicates that the Y-counter value has exceeded its minimum value (maximum negative) (e.g., the Y-counter has gone below −128 in the present embodiment). Control therefore passes to a process block 738, the Y-counter is set to its minimum value, and the Y-overflow flag is set in the current data packet, indicating the overflow in the Y-counter. Control then passes to the process block 740, wherein the new Y-counter value replaces the previous Y-counter value in the current data packet. The "packet changed" flag is also set, indicating to the keyboard controller 150 that the mouse data packet has changed.

Once the new Y-counter data has replaced the previous Y-counter value in the data packet, control passes to the decision block 742. At the decision block 742, the keyboard controller 150 determines if the right cell 306 is active. If the right cell 306 is not active, then the keyboard controller 150 begins processing the data signals transmitted from the left photo-voltaic cell 304, beginning at a decision block 754. However, if the right cell 306 is active (decision block 742), then control passes from the decision block 742 to a process block 744, and the keyboard controller 150 retrieves the current value of an X-counter. The X-counter value is the horizontal equivalent of the Y-counter value, and serves a similar function (i.e., to indicate the distance that the cursor is moved on the screen 160 in the horizontal direction). Once the X-counter value has been retrieved, the keyboard controller 150 adds the current speed value to the value within the X-counter, to replace the current X-counter value, as represented in a process block 746. When the speed value has been added to the X-counter value, control passes to a decision block 748.

At the decision block 748, the keyboard controller 150 determines if the X-counter has overflowed in the positive direction. If a positive overflow has not occurred in the X-counter, control passes to a process block 752. However, if the X-counter has overflowed in the positive direction, this indicates that the X-counter value has exceeded its maximum value (e.g., exceeded 127 in the present embodiment). Control therefore passes to a process block 750, and the keyboard controller 150 sets the X-counter to its maximum value and sets an X-overflow flag (e.g., a single bit) in the current data packet. The keyboard controller 150 then replaces the previous X-counter value with the new X-counter value in the current mouse data packet and sets the "packet changed" flag.

Once the new X-counter value has replaced the previous X-counter value in the mouse data packet, the keyboard controller 150 determines if the left photo-voltaic cell 304 is currently active, as represented in the decision block 754. If the left cell 304 is not active, then control passes to a decision block 766 (FIG. 7d) through a continuation point B. However, if the left cell 304 is active, then control passes from the decision block 754 to a process block 756, and the keyboard controller 150 retrieves the current value of the X-counter. Once the X-counter value has been retrieved (process block 756), the keyboard controller 150 subtracts the current speed value from (i.e., adds the corresponding twos-complement to) the value within the X-counter, and replaces the original X-counter value, as represented in a process block 758. When the speed value has been subtracted from the X-counter, control passes to a decision block 760. At the decision block 760, the keyboard controller 150 determines if the X-counter has overflowed in the negative direction. If the X-counter has not overflowed in the negative direction, control passes to a process block 764. However, if the X-counter has overflowed in the negative direction, this indicates that the X-counter value exceeded its minimum (i.e., maximum negative) value (e.g., −128 in the present embodiment). Control therefore passes to a process block 762, and the keyboard controller 150 sets the X-counter to its minimum value and also sets an X-overflow flag in the current mouse data packet. The keyboard controller 150 then replaces the previous X-counter value in the current mouse data packet with the new X-counter value, as represented in the process block 764. Additionally, the keyboard controller 150 sets the "changed packet" flag.

The "changed packet" flag is set anytime data changes in the mouse data packet. This is for use by the keyboard controller 150 to determine if there is any new data in a packet which needs to be sent to the host 140 at the proper report interval.

Once the keyboard controller 150 has passed through the processing of each of the photo-voltaic cells 300–306, control passes to the decision block 766 (FIG. 7d) via the continuation point B. At the decision block 766, the keyboard controller 150 determines if the speed value should be reset to a value of one. The speed value is reset to a value of one each time all of the cells 300–306 are inactive (i.e., the user is not applying pressure on the fingerpad 120 so that the light 270 from the photodiode 210 is absorbed by the plate 250). This assures that the next time the user presses the fingerpad 120 so that the light 270 impinges upon one of the cells 300–306, the speed of the cursor on the screen 160 will start at a moderate speed and gradually accelerate to the maximum speed if the user continues to apply pressure to the fingerpad 120 for the preselected interval. If the speed value is to be reset, the keyboard controller 150 sets the speed value to one, as represented in a process block 768. From the process block 768, control returns to the subroutine of FIG. 6 at the decision block 631.

If, at the decision block 766, the keyboard controller 150 determines that the speed value should not be reset, then control passes from the decision block 766 to an action block 770, and the keyboard controller 150 resets a Mouse Timer value.

In the present embodiment, the Mouse Timer value is reset to correspond to the resolution of the mouse as follows:

| Mouse Timer (counts/second) | Mouse Resolution (counts/mm) |
| --- | --- |
| 12.5 counts/second | 1 counts/mm |
| 25 counts/second | 2 counts/mm |
| 50 counts/second | 4 counts/mm |
| 100 counts/second | 8 counts/mm |

For example, with the mouse resolution set to 1 count/mm, the Mouse Timer is set to a value such that the keyboard controller 150 will check the up, down, right and left photo-voltaic cells 300-306 12.5 times every second (1 time every 8 milliseconds).

Once the Mouse Timer period has been reset in the action block 770, control passes to a decision block 772, and the keyboard controller 150 determines if the user has been applying pressure to the fingerpad 120 so that one or more of the cells 300-306 is active for at least 600 milliseconds since the first activation of a cell or since the last increment in the speed value. If 600 milliseconds have not elapsed, then control returns to the decision block 631 (FIG. 6). If 600 milliseconds have elapsed, then control passes to a decision block 774. At the decision block 774, the keyboard controller 150 determines if the speed value is already equal to its maximum value (e.g., three in the present embodiment). If the speed value is not equal to its maximum value, then control passes to a process block 776, and the speed value is incremented by one in the present embodiment. If, however, the speed value is already at its maximum, then the increment is ignored and the speed value remains at the maximum value. Control returns from either the decision block 774 or the process block 776 to the decision block 631 (FIG. 6).

At the decision block 631 (FIG. 6), the keyboard controller 150 determines if the report interval (e.g., the sample interval) has expired. In other words, the keyboard controller 150 determines if it is time to forward a data packet to the host 140. If the report interval has not elapsed, as determined at the decision block 631, control returns to the beginning of the routine, and the keyboard controller 150 again processes the data from the cells 300-306, as explained above. If the sample interval has elapsed, the keyboard controller 150 determines if the current mouse packet has changed, as represented in a decision block 632, by checking the "changed packet" flag. If the data packet has not changed since the transmission of the last data packet, then control returns to the beginning of the subroutine and the packet is not sent. If the report interval has elapsed (decision block 631) and the data packet has changed since the last transmission (decision block 632), then the keyboard controller 150 transmits the mouse data packet to the host 140 via the output port of the keyboard controller 150. The transmission of the mouse data packet occurs in accordance with conventional protocols as if the data packet were from a conventional mouse connected to the serial input port or the mouseport, as is well understood in the art. The transmission of data to the host 140 is represented in an action block 635.

It should be noted that whenever two or more cells 300-306 are illuminated at the same time, the keyboard controller 150 will detect this, and data representing the activity of the active cells will be stored in the packet. Accordingly, if a horizontal cell 304, 306 and a vertical cell 300, 302 are both simultaneously illuminated and remain active for the same period of time, the cursor will effectively move in a 45° direction across the screen 160. If a vertical cell 300, 302 and a horizontal cell 304, 306 are simultaneously illuminated for a portion of a sample interval, and for the remainder of the sample interval only a vertical or horizontal cell remains active, the number of X counts and Y counts transmitted to the host 140 will be uneven, and the angle of cursor movement across the computer screen 160 will be other than 45°.

It should further be noted that the data packets as described in FIGS. 7a-7d above, are substantially the same in format as data packets which are generated by mouse pointer devices connected to the serial or mouseport. Furthermore, the mouse commands used in accordance with the present invention follow standard mouse protocol which is well known in the art.

The present invention may be embodied in other specific forms without departing from its spirit or essential characteristics. For example, instead of tilting the flat photovoltaic cells 300-306 as shown in FIGS. 2a-2d, one skilled in the art may use concave cells which maintain an approximately constant radius from the light emitting face of the diode 210. Also, several arrangements may be contemplated for the photo-voltaic array 220 such as 8 or 16 cells which are positioned radially about a center dead region instead of the four cells illustrated in the present embodiment. Furthermore, the invention may be modified to emulate a one-button or three-button mouse. Thus, the described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fingerpoint mouse for use with a computer system having a graphical visual display with a graphics cursor, said mouse comprising:

a housing;

an elastic membrane supported by said housing and having a movable recess constructed to receive a finger of a user, said recess having a surface which tilts in response to pressure applied by the finger;

sensing circuitry which senses the motion of said recess caused by movement of the finger and generates a signal indicative of said motion, said sensing circuitry comprising a source of light connected to said surface of said recess such that said source of light tilts with said surface in response to pressure applied by the finger, and a plurality of photosensitive cells positioned within said housing with said source of light suspended above said photosensitive cells, said photosensitive cells arranged so as to detect movement of said source of light; and conversion circuitry which converts said signals indicative of the motion of said recess into signals suitable to effect motion of a graphics cursor on said visual display.

2. The fingerpoint mouse as defined in claim 1, wherein said plurality of photosensitive cells comprises four cells disposed in an orthogonal array such that a respective one of said cells senses light when the finger moves in one of four orthogonal directions.

3. The fingerpoint mouse as defined in claim 2, wherein said orthogonal directions correspond to movement of said graphics cursor up, down, left and right on said graphical visual display.

4. The fingerpoint mouse as defined in claim 2, wherein each photosensitive cell generates an active output signal when light from said light source is incident on said photosensitive cell, said recess having a rest position when no pressure is applied to said recess, said light source being positioned so that when said recess is in said rest position, no light from said light source is incident on any of said photosensitive cells and no active output signal is generated.

5. The fingerpoint mouse as defined in claim 1, further including at least one switch to provide a signal having an active state and an inactive state, said switch operable by a finger of said user.

6. A fingerpoint mouse as defined in claim 1, wherein said housing is a peripheral enclosure.

7. The fingerpoint mouse of claim 1, wherein said source of light comprises a photodiode.

8. The fingerpoint mouse as defined in claim 1, wherein said photosensitive cells comprise an array of photo-voltaic sensors.

9. The fingerpoint mouse of claim 1, wherein said source of light is an infrared photodiode and said photosensitive cells are an array of photo-voltaic cells which sense infrared light.

10. A pointing device for controlling the movement of a cursor on a display in response to operator input, comprising:
   a flexible target that receives a finger of the operator and a portion of which tilts in response to pressure applied by the finger;
   a source of light coupled to the flexible target so as to tilt with the movement of the target; and
   a plurality of light sensors positioned to selectively receive light from the source of light in response to movement of the source of light and to generate respective output signals, the light sensors positioned so that selected ones of the sensors receive light in response to movement of the target in selected directions.

11. The fingerpoint mouse as defined in claim 10, wherein said plurality of light sensors comprises four photosensitive cells disposed in an orthogonal array such that at least one of said cells detects light when the finger moves in one of four orthogonal directions.

12. A pointing device for controlling the movement of a cursor on a display in response to operator input, comprising:
   a flexible pad onto which pressure may be applied by a finger of the operator, at least a portion of said pad being deflectable in response to changes in pressure applied to said pad;
   a light source attached to the pad to move in response to movement of said portion; and
   at least four light sensors positioned below said flexible pad to receive light from said light source when said light source moves, said light sensors positioned so that at least one light sensor receives light from said light source in response to movement in any one of four orthogonal directions.

13. The fingerpoint mouse as defined in claim 12, wherein said pad comprises an elastic membrane.

14. The fingerpoint mouse as defined in claim 12, wherein said orthogonal directions correspond to movement of said graphics cursor up, down, left, and right, on said graphical visual display.

15. The fingerpoint mouse as defined in claim 14, wherein each light sensor generates an active output signal when light from said light source is incident on said light sensor, said pad having a neutral position when no pressure is applied to the pad, said light source being positioned so that when said pad is in said neutral position, no light from said light source is incident on any of said light sensors and no active output signal is generated.

16. The fingerpoint mouse as defined in claim 12, wherein said pad includes a movable recess formed in said pad and configured to receive a finger of the operator, said light source attached to said pad on a side of said pad opposite that of said recess, said light source being adapted to tilt in a direction opposite a direction in which the recess is moved by the application of pressure.

* * * * *